Figure 1:
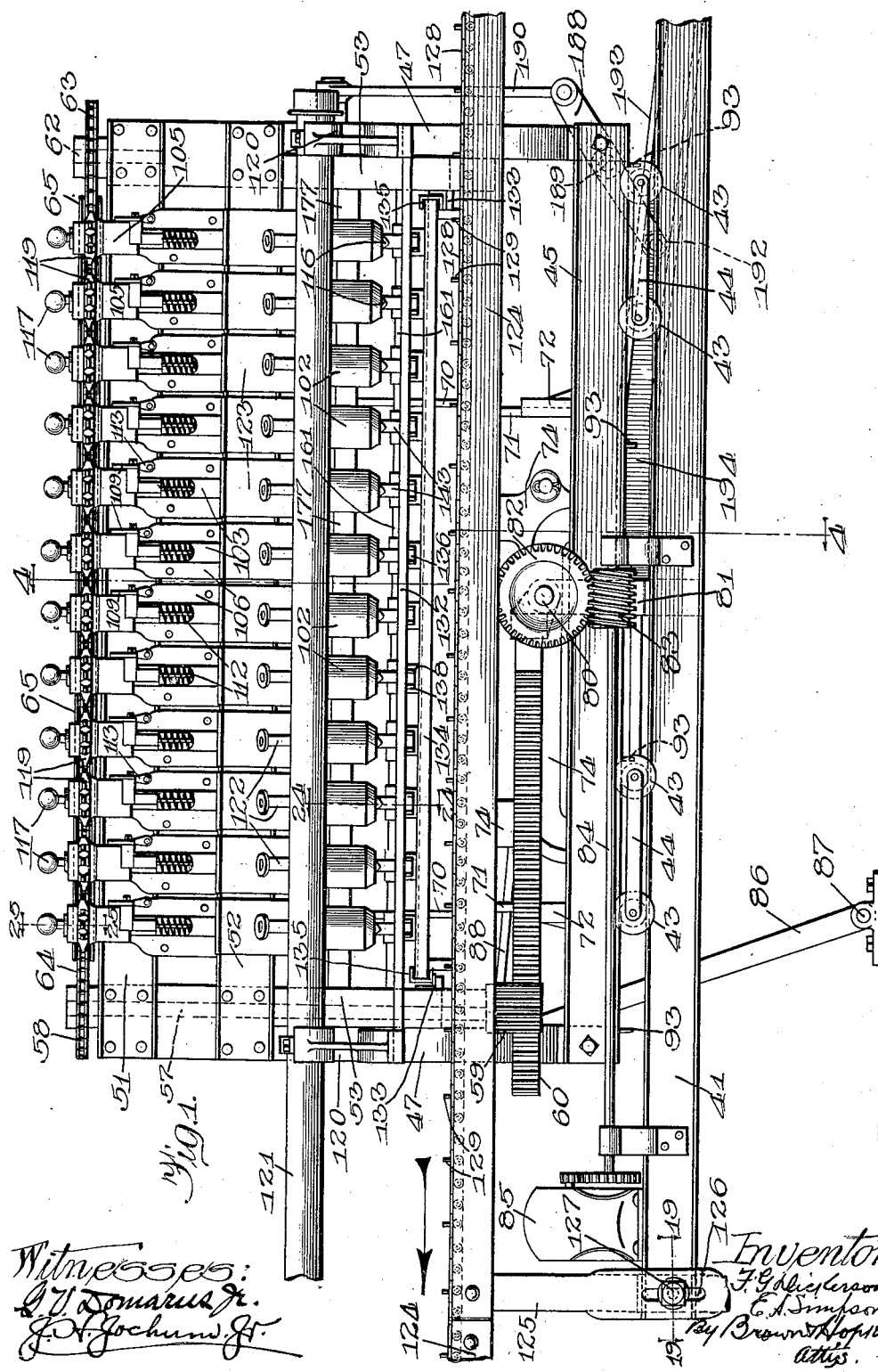

F. G. DICKERSON & E. A. SIMPSON.
MACHINE FOR SOLDERING CANS.
APPLICATION FILED MAR. 30, 1908.

1,064,299.

Patented June 10, 1913.

12 SHEETS—SHEET 1.

F. G. DICKERSON & E. A. SIMPSON.
MACHINE FOR SOLDERING CANS.
APPLICATION FILED MAR. 30, 1908.

1,064,299. Patented June 10, 1913.
12 SHEETS—SHEET 4.

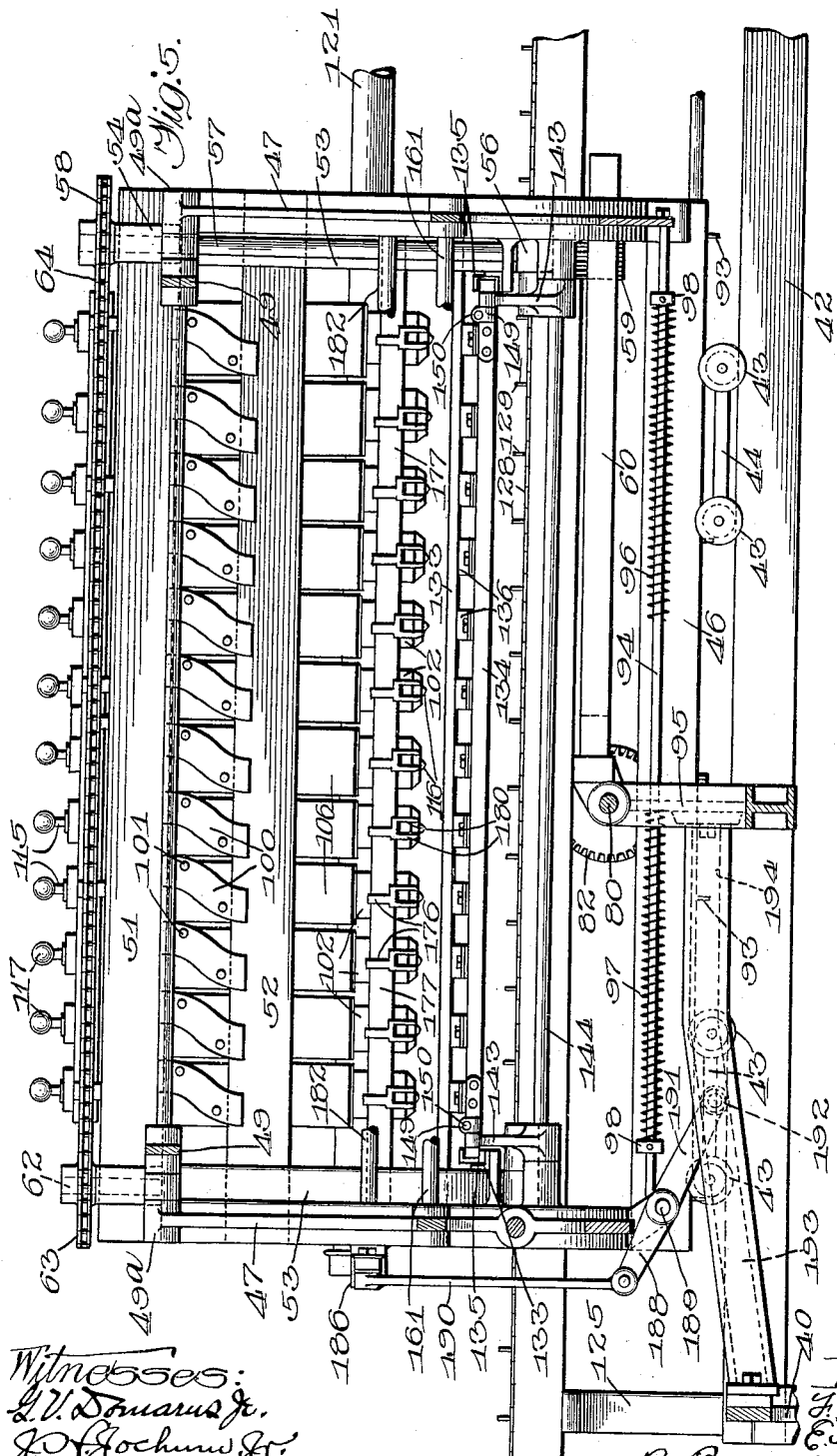

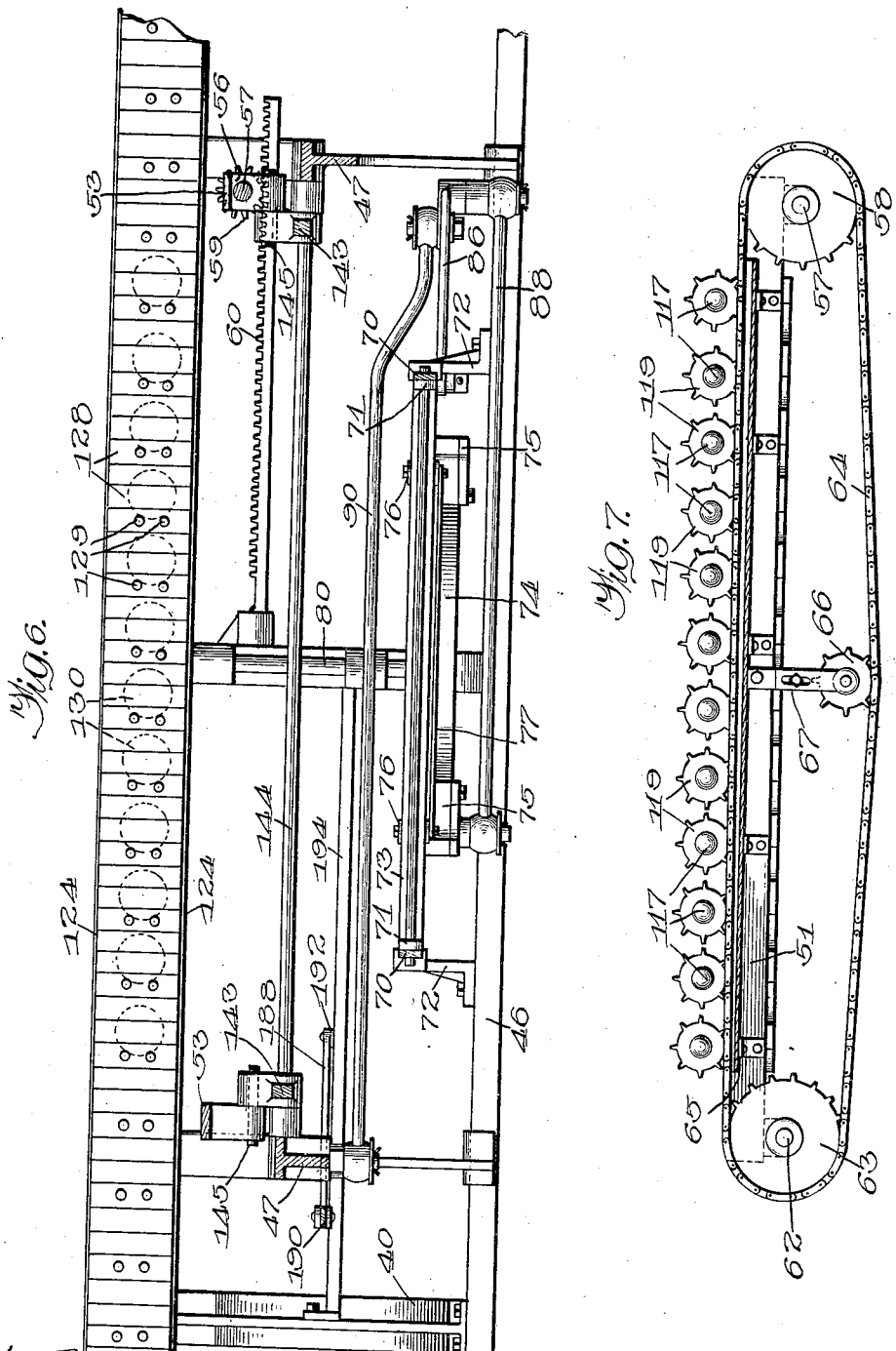

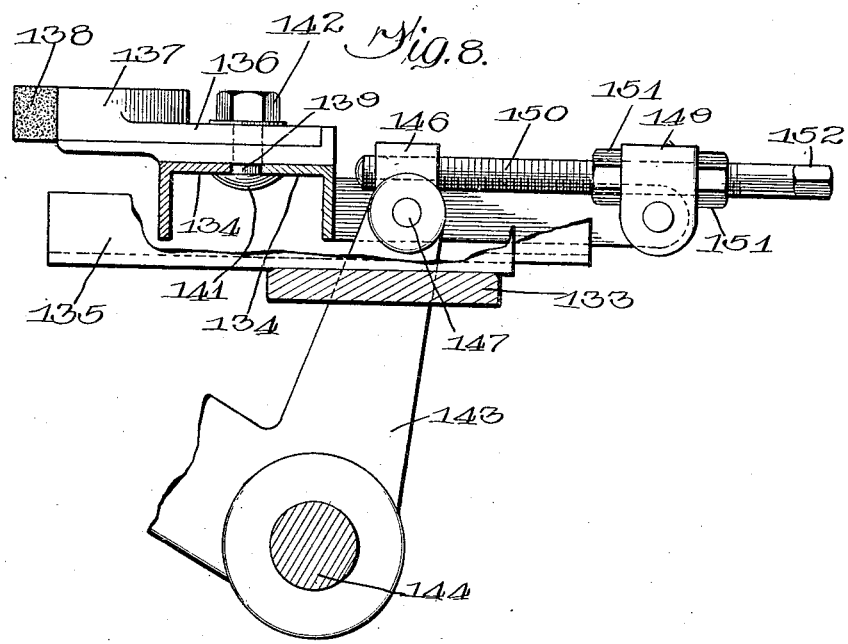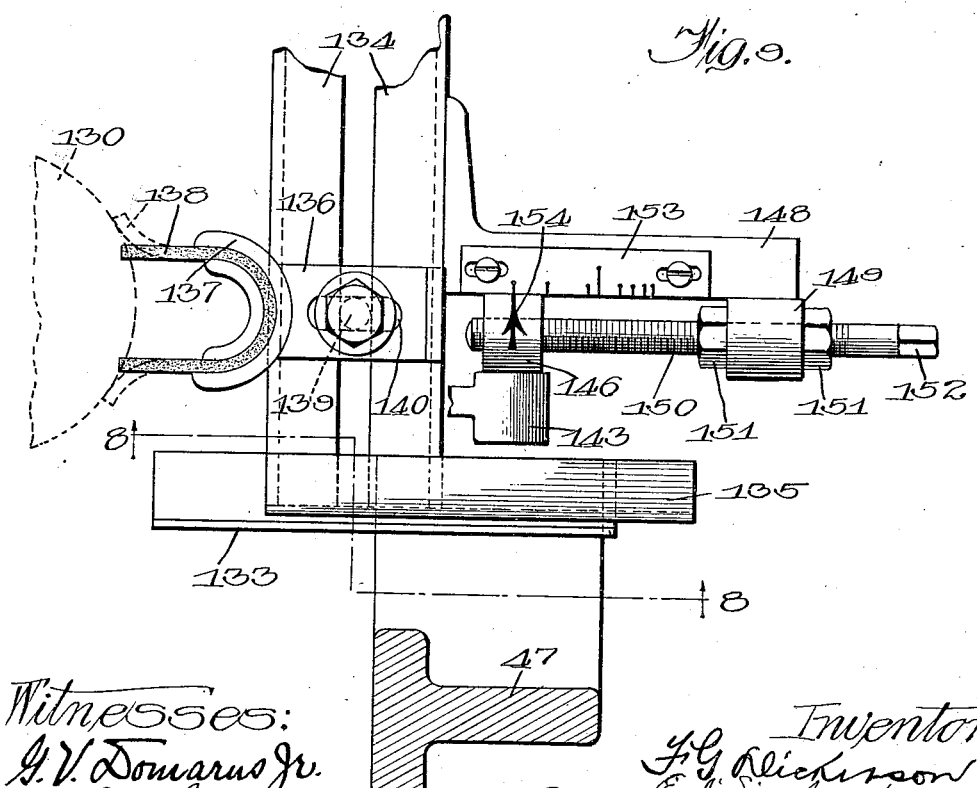

F. G. DICKERSON & E. A. SIMPSON.
MACHINE FOR SOLDERING CANS.
APPLICATION FILED MAR. 30, 1908.
1,064,299.
Patented June 10, 1913.
12 SHEETS—SHEET 8.
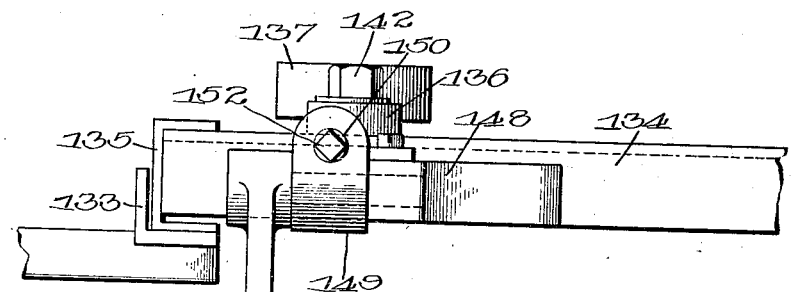
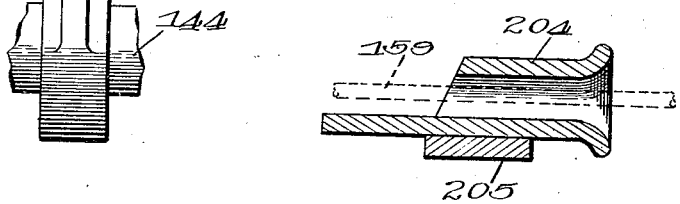
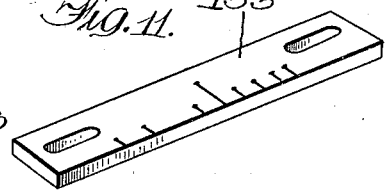
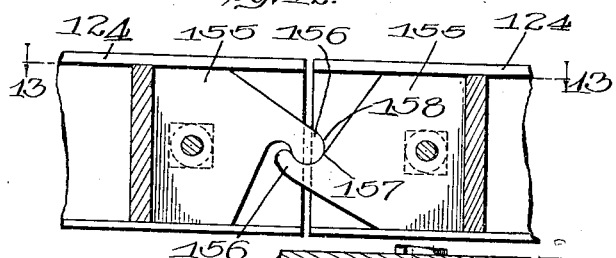
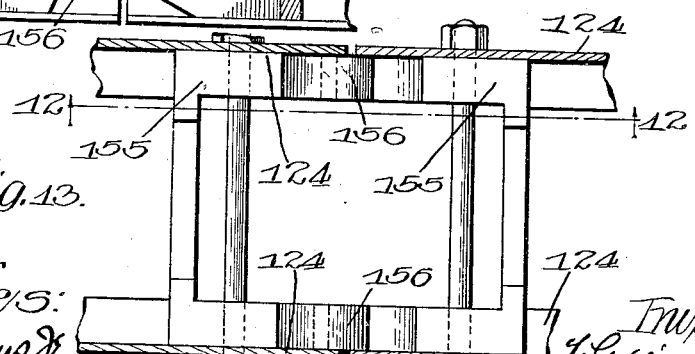

F. G. DICKERSON & E. A. SIMPSON.
MACHINE FOR SOLDERING CANS.
APPLICATION FILED MAR. 30, 1908.
1,064,299.
Patented June 10, 1913.
12 SHEETS—SHEET 9.
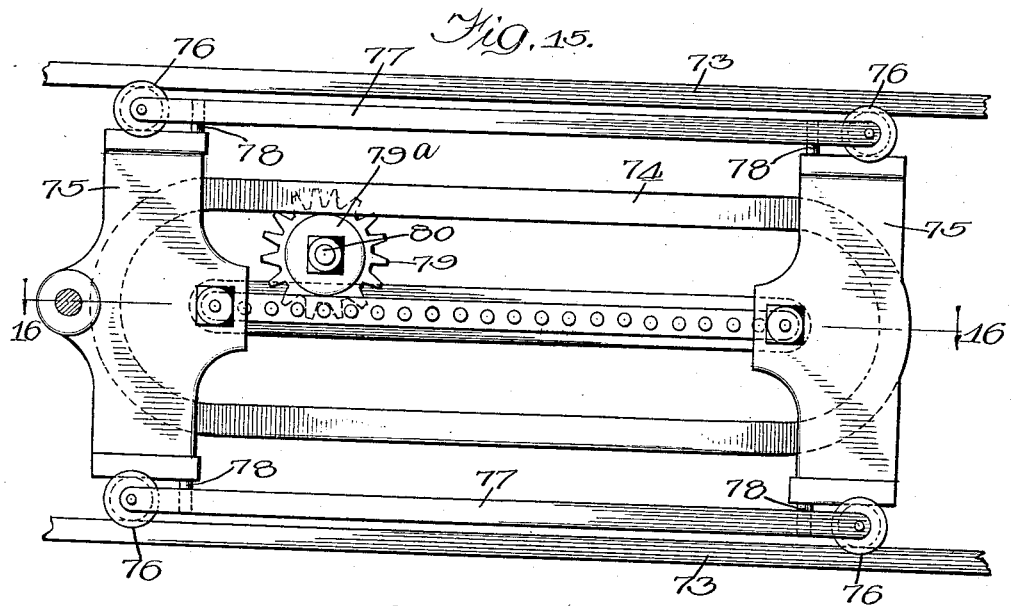
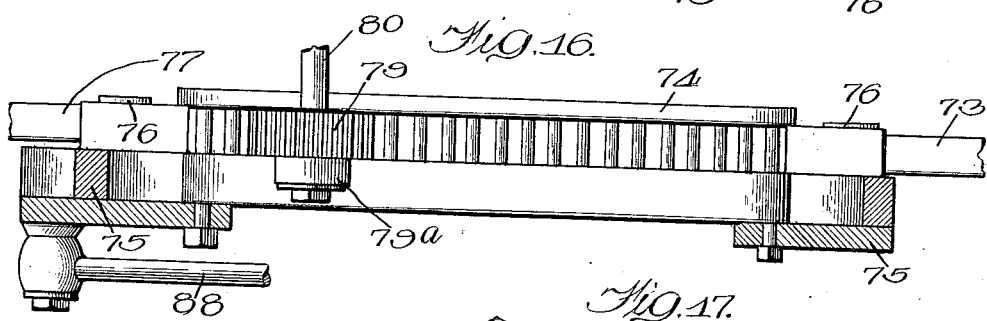
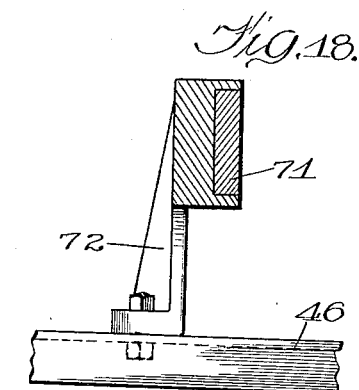
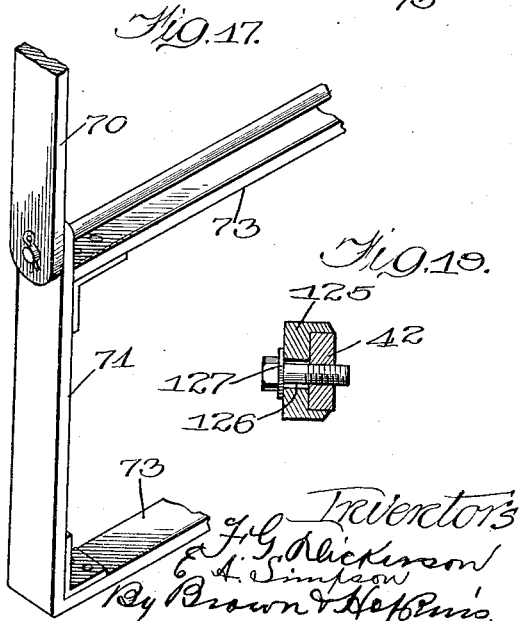
Witnesses:
Inventors
F. G. Dickerson
E. A. Simpson
By Brown & Heppins
attys.
COLUMBIA PLANOGRAPH CO., WASHINGTON, D. C.

F. G. DICKERSON & E. A. SIMPSON.
MACHINE FOR SOLDERING CANS.
APPLICATION FILED MAR. 30, 1908.
1,064,299.
Patented June 10, 1913.
12 SHEETS—SHEET 10.
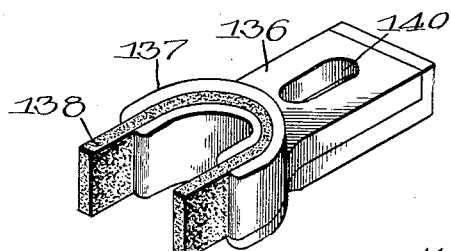
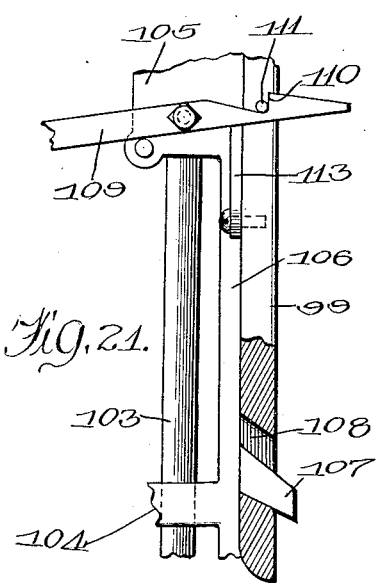
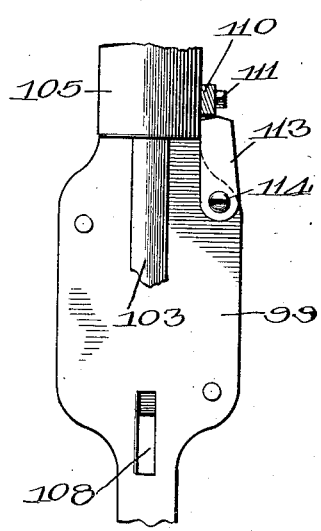
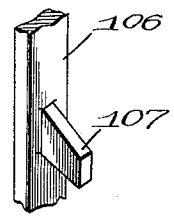
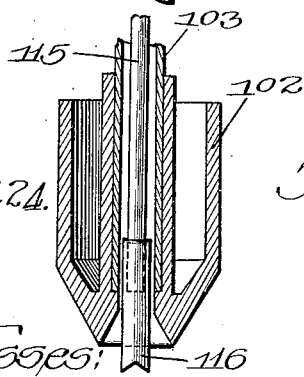
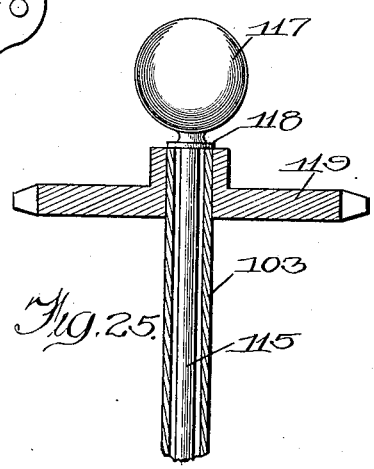

F. G. DICKERSON & E. A. SIMPSON.
MACHINE FOR SOLDERING CANS.
APPLICATION FILED MAR. 30, 1908.
1,064,299.
Patented June 10, 1913.
12 SHEETS—SHEET 11.
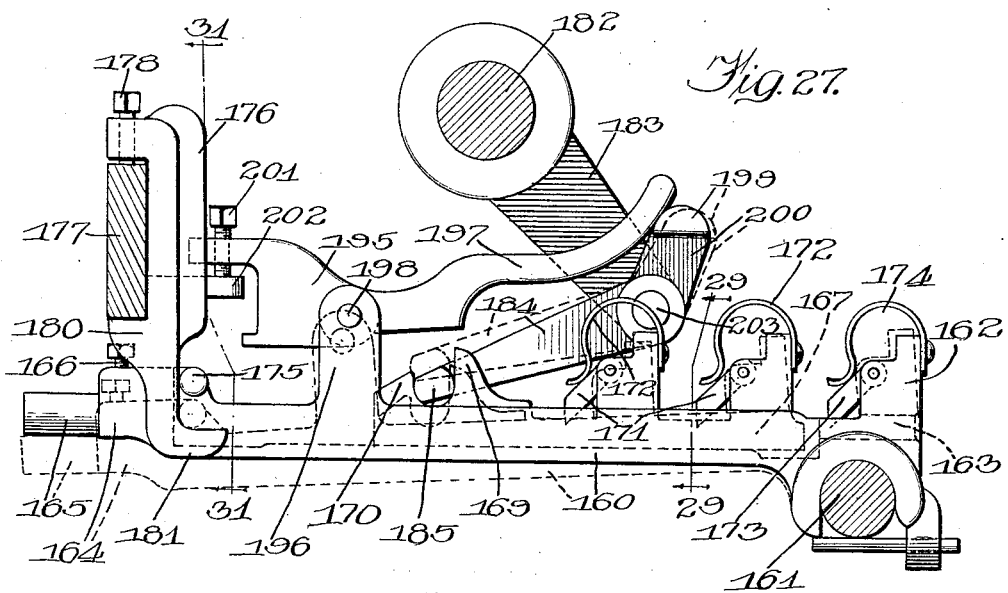
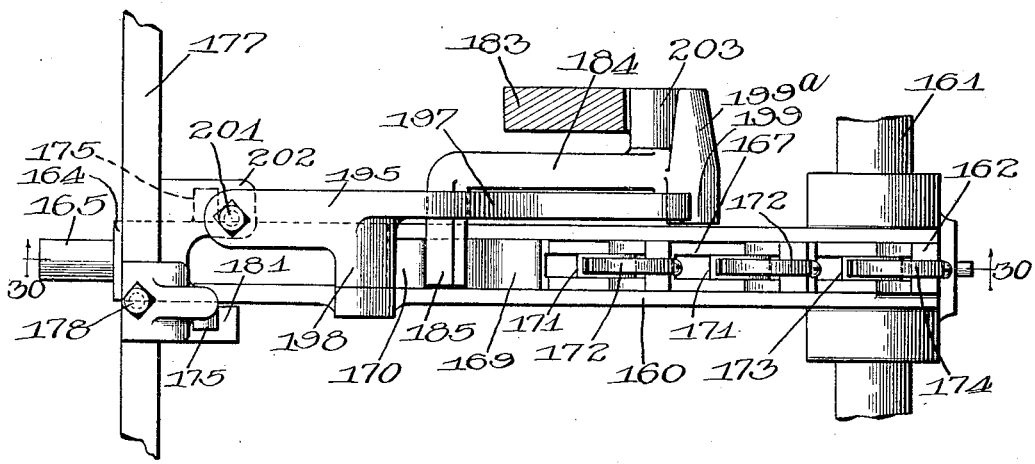
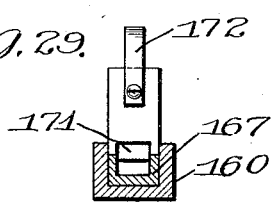
Witnesses:
Inventors
COLUMBIA PLANOGRAPH CO., WASHINGTON, D. C.

F. G. DICKERSON & E. A. SIMPSON.
MACHINE FOR SOLDERING CANS.
APPLICATION FILED MAR. 30, 1908.
1,064,299.
Patented June 10, 1913.
12 SHEETS—SHEET 12.
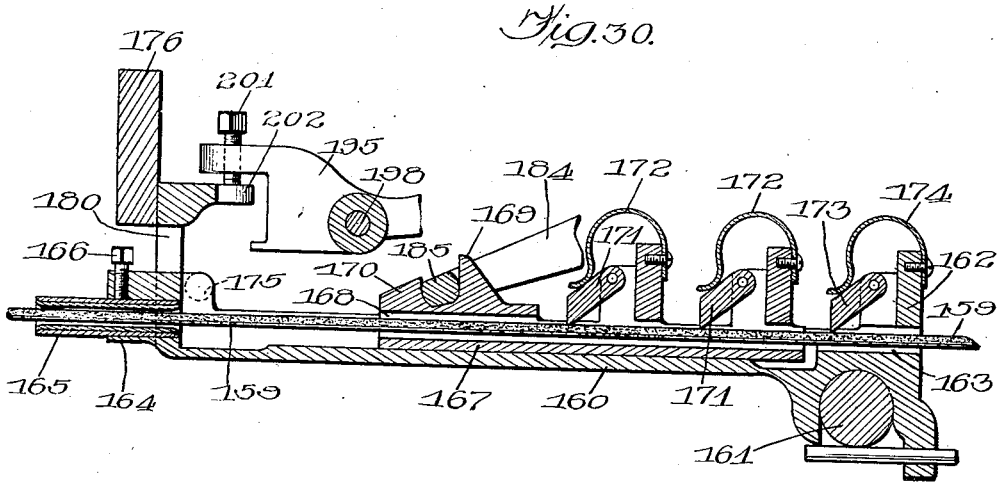
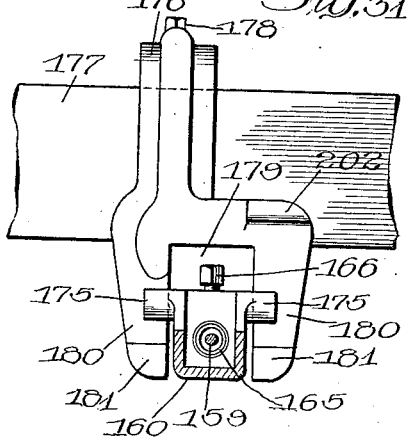
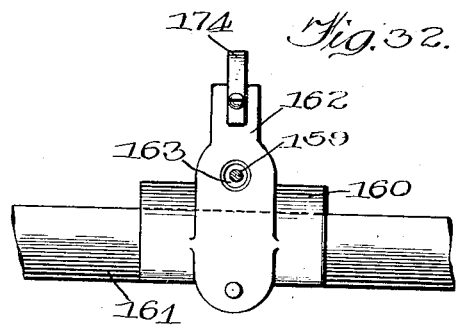
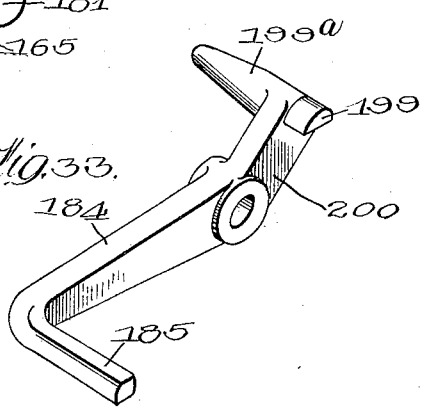
Witnesses:
G. V. Domarus Jr.
J. H. Jochum, Jr.
Inventors
F. G. Dickerson
E. A. Simpson
By Brown & Hopkins
Attys.

UNITED STATES PATENT OFFICE.

FRED G. DICKERSON AND EDMUND A. SIMPSON, OF CHICAGO, ILLINOIS, ASSIGNORS, BY MESNE ASSIGNMENTS, TO CHICAGO SOLDER COMPANY, OF CHICAGO, ILLINOIS, A CORPORATION OF ILLINOIS.

MACHINE FOR SOLDERING CANS.

1,064,299.   Specification of Letters Patent.   Patented June 10, 1913.

Application filed March 30, 1908. Serial No. 424,108.

*To all whom it may concern:*

Be it known that we, FRED G. DICKERSON, a citizen of the United States, and EDMUND A. SIMPSON, a subject of the King of England, and both residing at Chicago, in the county of Cook and State of Illinois, have invented certain new and useful Improvements in Machines for Soldering Cans, of which the following is the specification.

This invention relates to improvements in machines for soldering cans and the like, and the primary object of the invention is to provide an improved machine of this character in which the soldering iron or tool is advanced or bodily moved with the can while in engagement therewith, and during the soldering operation, and returned to properly position it with respect to the next can which is being fed to the machine.

A further object is to provide an improved machine of this character in which the can is continuously moved with the tool.

A further object is to provide an improved machine of this character in which the movement of the can through the machine is uninterrupted, and in which the soldering tool or iron is bodily advanced with the can while a rotary motion is being imparted to the tool.

A further object is to provide improved means for gripping and holding the can against rotary motion while the cap is being soldered thereon, and improved means for adjusting the gripping mechanism to accommodate cans of various sizes.

A further object is to provide improved means for advancing the soldering tool or iron supporting frame with the can as the latter moves through the machine, and for returning the frame to properly position the tool with respect to the can which has been advanced to a position to be soldered, and improved means for shifting the frame or carriage to move the tool or iron into and out of engagement with the can.

A further object is to provide means for cushioning the carriage or movable frame work when the latter has reached the limit of its travel in either direction, and which means will assist in starting the carriage or frame work on its return movement.

A further object is to provide an improved soldering tool or iron, and improved means for independently and detachably securing a plurality of tools to the supporting frame or carriage whereby any one or more of the tools may be removed without interfering with the remaining tools and without stopping the machine.

A further object is to provide improved means for imparting a rotary motion to the soldering tools or irons.

A further object is to provide improved means for feeding strips of solder to the soldering tools or irons, and improved means whereby the solder feeding mechanism may be automatically thrown into and out of operation.

A further object is to provide an improved solder feeding device and improved means whereby the feed of the solder will be prevented when there is no can in position to receive the solder, and which means coöperates with the can for causing the solder to be fed.

A further object is to provide an improved machine of this character which will be simple and durable in construction, and effective and efficient in operation.

To the attainment of these ends and the accomplishment of other new and useful objects, as will appear, the invention consists in the features of novelty in the construction, combination and arrangement of the several parts hereinafter more fully described and claimed, and shown in the accompanying drawings illustrating the embodiment of the invention, and in which—

Figure 2:
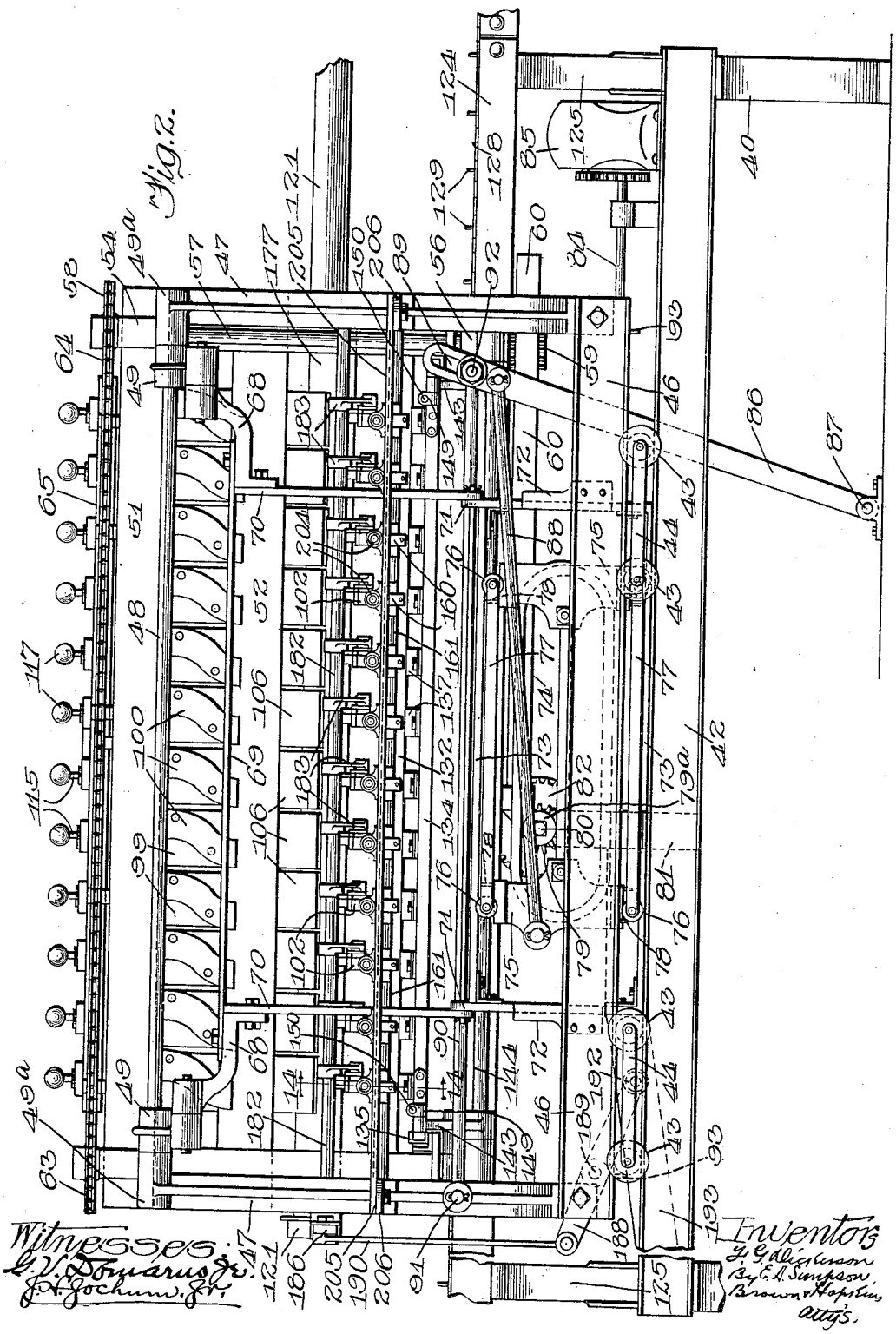
Figure 3:
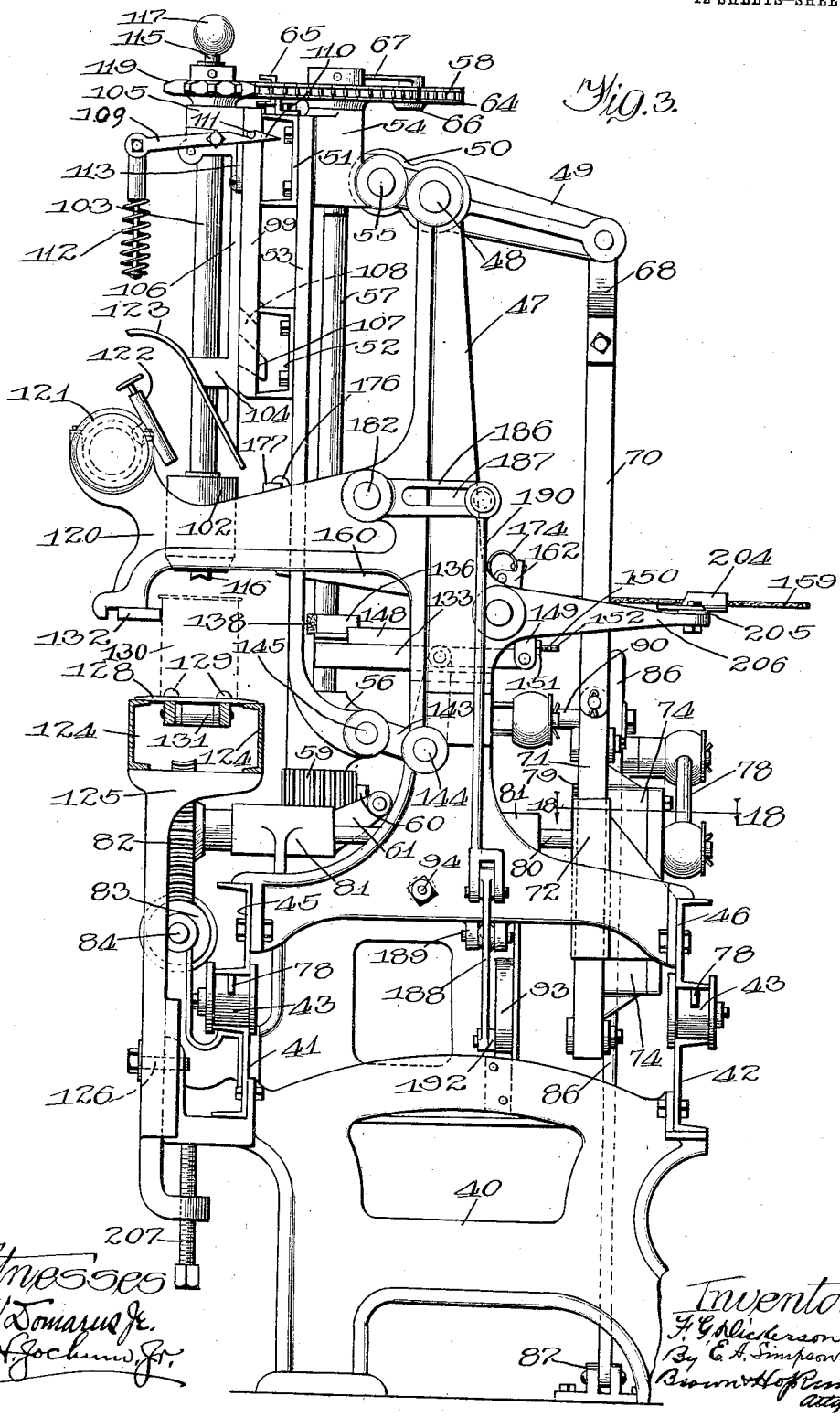
Figure 4:
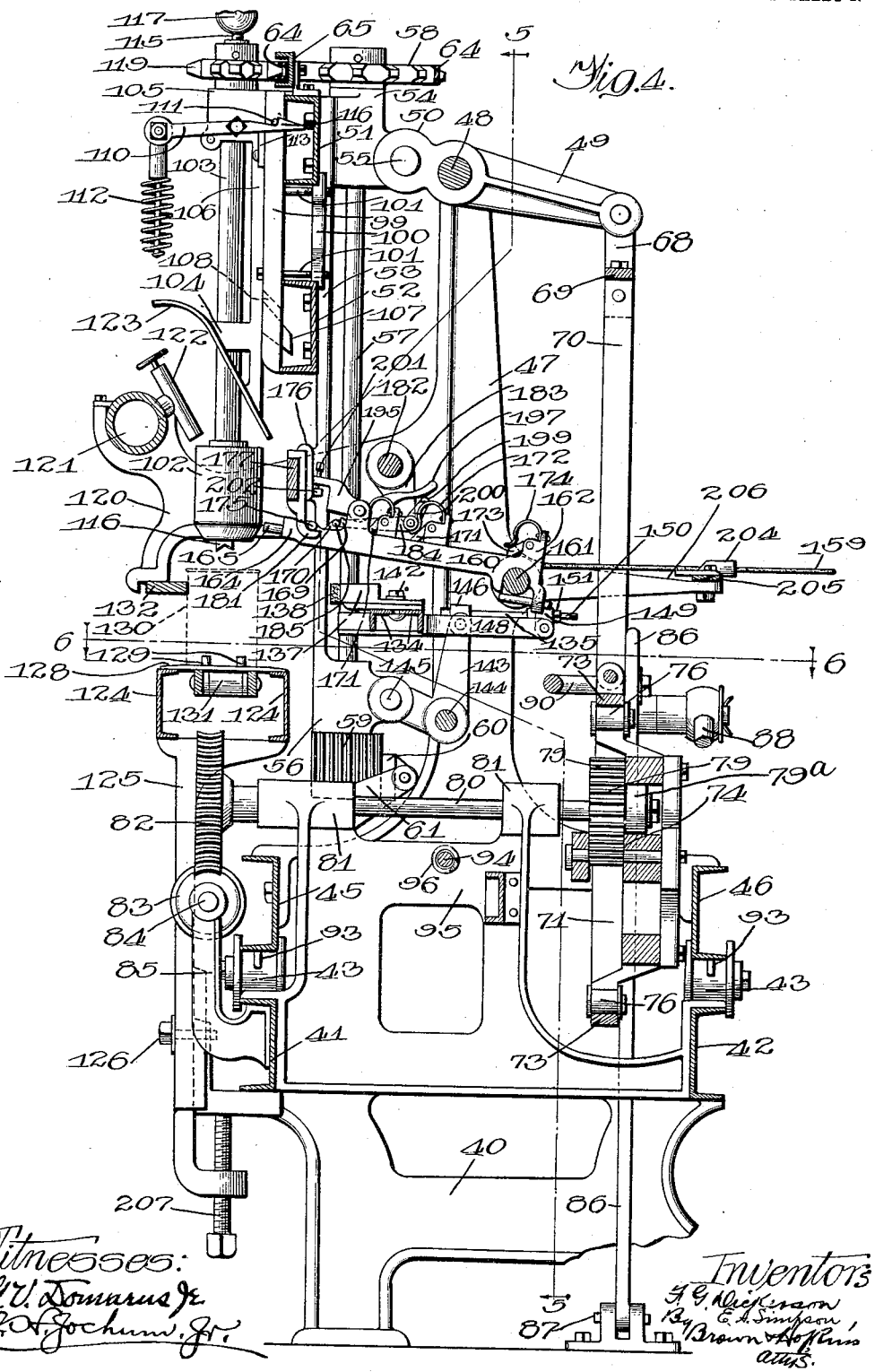

Figure 1 is a front elevation of an improved machine of this character constructed in accordance with the principles of this invention. Fig. 2 is a rear elevation. Fig. 3 is a right hand end elevation. Fig. 4 is a sectional view on line 4—4 of Fig. 1. Fig. 5 is a sectional view on line 5—5 of Fig. 4. Fig. 6 is a detail sectional view on line 6—6 of Fig. 4. Fig. 7 is a detail plan view of the mechanism for imparting a rotary motion to the soldering irons or tools. Fig. 8 is a detail sectional view on line 8—8 of Fig. 9. Fig. 9 is a top plan view of one of the gripping devices for holding the cans against rotary motion while the cap is being soldered thereto. Fig. 10 is a right hand end elevation of Fig. 8. Fig. 11 is a detail perspective view of the gage for adjusting the gripping mechanism. Fig. 12 is a detail elevation, partly in section, of the joint between the two sections of the supporting table for the cans, taken on line 12—12 of Fig. 13. Fig. 13 is a sectional view on line 13—13 of Fig. 12. Fig. 14 is a detail sectional view of the guide for the solder strip, taken on line 14—14 of Fig. 2. Fig. 15 is a detail elevation of the mangle rack for shifting the carriage or supporting frame. Fig. 16 is a sectional view on line 16—16 of Fig. 15. Fig. 17 is a detail perspective view of a portion of the frame work for moving the soldering tools or irons into and out of engagement with the cans. Fig. 18 is a detail sectional view on line 18—18 of Fig. 3. Fig. 19 is a detail sectional view taken on line 19—19 of Fig. 1. Fig. 20 is a detail perspective view of one of the gripper jaws for holding the cans against rotary motion. Fig. 21 is an enlarged detail view, partly in section, of the support for the soldering tool or iron, and showing the manner of securing the tool or iron to the support. Fig. 22 is a detail front elevation of the support shown in Fig. 21. Fig. 23 is a detail perspective view of the guide lug for positioning the tools or irons with relation to the support. Fig. 24 is a detail sectional view on line 24—24 of Fig. 1. Fig. 25 is a detail sectional view on line 25—25 of Fig. 1. Fig. 26 is a detail elevation of the member for holding the cap in position on the can to be soldered. Fig. 27 is a detail elevation of one of the solder feeding devices. Fig. 28 is a top plan view of Fig. 27. Fig. 29 is a detail sectional view on line 29—29 of Fig. 27. Fig. 30 is a detail sectional view on line 30—30 of Fig. 28. Fig. 31 is a detail sectional view on line 31—31 of Fig. 27. Fig. 32 is a detail right hand elevation of Fig. 30. Fig. 33 is a detail perspective view of the operating pawl for the solder feeding devices.

Referring more particularly to the drawings, and in the present exemplification of the invention, the numeral 40 designates uprights or standards which support suitable guides or ways 41, 42, spaced from each other and located adjacent the front and rear of the machine. Mounted to move upon the guides or ways 41, 42, are anti-friction rollers 43 which are preferably connected in pairs by means of connecting bars or rods 44 to form trucks which are spaced from each other and which are adapted to support the movable frame work or carriage of the machine. The anti-friction rollers 43 are preferably grooved, as shown more clearly in Figs. 3 and 4 of the drawings, to form flanges which engage the side edges of the guides or ways 41, 42 to prevent lateral displacement of the trucks. Any number of these anti-friction trucks may be provided, but in the present exemplification of the invention there is shown two, arranged to move upon each of the guides or ways 41, 42.

A supporting carriage, preferably comprising spaced members 45, 46, and preferably constructed of channel iron, rest upon and engage the anti-friction rollers 43, and supported by and arranged between the members 45, 46, are uprights or standards 47, one of which is arranged adjacent the ends of the members 45, 46, and are spaced from each other any desirable distance according to the length of movable frame work or carriage it is desired to use, and also in accordance with the number of soldering tools or irons. These uprights or standards 47 may be of any desired or suitable height and are connected at their upper extremities in any desired or suitable manner, preferably by means of a bar or rod 48, the extremities of which rest in suitable bearings 49$^a$ on the standards 47, and which bar or rod may be held against displacement in any desired or suitable manner.

Pivotally mounted on the bar or rod 48 are arms 49 which are preferably located adjacent the uprights or standards 47, and supported by the forward extremities 50 of these arms is a frame comprising spaced members 51, 52, preferably formed of channel iron and arranged with their open sides projecting away from the arms 49, and which are connected by end members 53, the latter extending for some distance below the bottom member 52. The frame thus formed is provided with bearings 54 which are preferably located intermediate the member 51 and the point of pivotal connection 55 of the extremities 50 of the arms 49 with the frame work, and the lower extremities of one of the end members 53 terminates in a bearing 56, which is arranged in line with the respective bearing 54; and journaled in these alined bearings 54, 56, adjacent one of the uprights or standards 47 is a shaft 57, one extremity of which projects above the bearing 54, and secured thereto is a sprocket wheel 58, which latter is adapted to impart a rotary motion to the soldering tools or irons in a manner to be set forth. The other extremity of the shaft 57 projects below the bearing 56, and secured to said extremity is an elongated gear 59. This gear engages a rack 60 which is supported by one extremity by means of an arm 61 which latter is secured to a stationary part of the supporting frame work, (as shown more clearly in Figs. 1 to 5 of the drawings) so that as the main supporting frame work or carriage is reciprocated in the manner hereinafter set forth, the gear 59 will be rotated by the rack 60, first in one direction and then in the other, according to the direction of movement of the supporting frame work or carriage. Journaled in the other bearing 54 at the opposite end of the supporting frame work or carriage is a shaft 62, secured to which is a sprocket wheel 63 (shown more clearly in Figs. 1, 2 and 5 of the drawings), and passing around these sprocket wheels 58, 63 is an endless sprocket chain 64 (shown more clearly in Fig. 7 of the drawings). One of the runs of the sprocket chain is adapted to move in a suitable guide way 65 (see Figs. 3 and 7), and the other run is adapted to be engaged by an idler 66, supported by an adjustable bracket 67, which is preferably secured to any suitable portion of the frame work, and by means of which the idler 66 may be adjusted to take up the slack of the sprocket chain 64. The pinion gear 59 being elongated and the rack 60 being fixed with respect to the gear, it will be apparent that the supporting frame or carriage for the soldering tools or irons may be raised or lowered with respect to the main supporting frame or carriage without disengaging the pinion and the rack.

The free ends of the arms 49 project toward the rear of the machine, and pivotally connected thereto are brackets 68 (see Figs. 2 and 4) and these brackets are connected and spaced from each other by means of a connecting bar or member 69, and depending from each of the brackets 68 are spaced members or rods 70 which may be of any desired length, and pivotally connected to the extremities thereof are bars or members 71 which are adapted to move in suitable guide ways 72 which are supported preferably by the member 46 of the main supporting frame or carriage, as shown more clearly in Figs. 2, 3, 17 and 18 of the drawings. The bars or members 71 are connected by transverse bars 73, as shown more clearly in Figs. 2 and 17, so that when the bars 71 are raised or lowered in their guide ways 72, the arms 49 will be rocked about their points of pivotal support 48 to raise and lower the supporting frame for the soldering tools or irons.

Any suitable means may be provided for raising and lowering the frame thus formed to rock the arms 49. A suitable and efficient means for accomplishing this purpose comprises a mangle rack designated generally by the reference numeral 74, which rack is supported by suitable end members 75 and is located within the frame formed by the bars or members 71, 73. Disposed between the end members 75 and the members 73 are suitable antifriction rollers 76 which engage the bars 73 and are movable longitudinally thereon when the mangle rack is moved, and the respective anti-friction rollers 76 are connected by means of a bar or member 77 so that the rollers will move in unison and thereby relieve the bars 73 of friction and permit the mangle rack to be readily adjusted. Suitable pins or projections 78 may be provided which project from the edges of the end member 75 into the path of movement of the anti-friction rollers to prevent displacement of the rollers when the rack has reached the limit of its movement in either direction.

The rack may be given a longitudinally reciprocating and vertical movement by means of a suitable pinion 79 mounted upon a shaft 80, which is journaled in suitable bearings 81 supported by the stationary portion of the frame, and connected to the shaft 80 is a worm gear 82 with which meshes a worm screw 83 carried by a shaft 84 journaled in suitable bearings 85 supported by the standards 40 (see Figs. 1, 3 and 4), and the shaft 84 is driven by means of a suitable motor 85, as shown more clearly in Figs. 1 and 2 of the drawings. With this improved construction it will be seen that when the shaft 84 is rotated by the motor 85, the worm screw and gear 83, 82, will impart a longitudinal movement to the mangle rack until the pinion 79 reaches the end of the rack, at which point it will raise or lower the rack according to the position of the pinion with respect thereto, and when the rack is raised or lowered, the arms 49 will be rocked to lower or raise the soldering irons or tools. During this movement of the mangle rack, the roller 79ª will support the adjacent end of the shaft 80 and will prevent the pinion 79 from getting out of mesh with the rack, which is important when the rack is reversing. At the same time the mangle rack is given a longitudinal movement upon the bars or rods 73, and in order to impart this longitudinal movement to the main supporting frame or carriage, the rack is connected in any desired or suitable manner to the carriage but in such a manner as to permit the rack to move vertically, independently of the main supporting frame or carriage. A suitable and efficient manner of connecting the rack to the carriage comprises a lever 86 which is pivotally supported as at 87 to any desired stationary portion of the machine. This arm may be of any desired or suitable length and is connected to the rack 74 by means of a bar or rod 88, one end of which is pivotally connected to the rack and the other end to the lever 86 at a point preferably remote from the free extremity thereof. (See Fig. 2). The free extremity of the lever 86 is preferably provided with an elongated slot 89 and a bar or rod 90 is pivotally connected by one of its extremities, as at 91, to one of the uprights or standards 47 of the main supporting frame or carriage, the free extremity of this bar or rod 90 being adjustable and pivotally connected to the slotted extremity 89 of the lever 86 by means of a suitable connection 92, so that when the rack is reciprocated longitudinally in the manner as set forth, the lever 86 will be rocked about its point of pivotal support 87 and a longitudinal reciprocating movement will be imparted to the main supporting frame or carriage through the medium of the connecting bar or rod 90 and the pivotal connections of these various elements will permit the rack to move vertically and independently with respect to the supporting frame or carriage, and also provides means whereby the longitudinal movement of the carriage may be increased with respect to the movement of the mangle rack. As the frame or carriage is moved longitudinally on the members 41, 42, the anti-friction rollers 43 will travel with the frame, and in order to prevent the anti-friction rollers from being displaced with relation thereto, there may be provided suitable depending lugs or pins 93 which are arranged within the path of movement of the respective rollers and are adapted to be engaged thereby when the rollers have reached the limit of their respective movement.

Arranged longitudinally of the main supporting frame or carriage is a bar or rod 94 which passes through an upright 95 supported by the members 41, 42, and arranged intermediate the uprights or standards 47, and the extremities of this rod or bar 94 are secured to the uprights or standards 47 so as to move therewith. Surrounding the bar or rod 94 on each side of the upright 95 are suitable flexible members 96, 97, such as coiled springs or the like, one extremity of each of which rests against suitable adjustable sleeves or collars 98 secured to the rod 94. The other extremity of each of these springs extends toward the upright 95 and is adapted to engage the upright to compress the springs.

When the main supporting frame or carriage is reciprocated longitudinally in the manner already set forth, the free extremity of the respective spring 96, 97 will engage the upright 95 before the carriage reaches the limit of its movement in the respective direction, and a further movement thereof in the same direction will compress the spring to place the same under tension to relieve the machine of shock or jar when it has reached the limit of its movement. The springs also assist in starting the carriage on its return movement, and at the same time the mangle rack is being shifted. Obviously, the sleeves 98 may be adjusted to vary the tension of these springs.

Arranged to extend across the front face of the members 51 and 52 are a plurality of spaced plates 99 (see Figs. 21 and 22) and these plates are secured and held in position in any desired or suitable manner, preferably by means of clips 100, which are arranged adjacent the rear face of the members 51, 52 to extend across the space therebetween, and passing through the plates 99 and clips 100 are suitable fastening bolts 101 (see Fig. 4) which bolts pass through suitable apertures in the plates and clips and are held from displacement in any desired or suitable manner, preferably by means of one extremity of the bolts being threaded into one of the members. Any number of these clips may be provided, but there is preferably provided one clip for each of the plates 99, and there is one plate for each of the soldering tools or irons.

The soldering tools or irons 102 are preferably hollow, as shown more clearly in Fig. 24 of the drawings, and are provided with a hollow shaft 103 which shaft is journaled in suitable bearings 104, 105, supported by a suitable base 106, and projecting from one face of the base 106, preferably at a point intermediate the bearings, is a lug or projection 107 which is adapted to enter a suitable recess 108 in the respective plate 99, and pivotally supported by one of the bearings, preferably the bearing 105 is a latch 109 having a hooked extremity 110 adapted to engage a suitable lug or projection 111 on the plate 99. The lug or projection 111 is preferably located on the side of the plate 99, as shown more clearly in Figs. 4 and 22 of the drawings, and is adapted to be engaged by the hooked extremity 110 of the latch 109 when the lug or projection 107 stands within a recess 108 of the plate 99. This lug or projection 107, together with the recess 108, are preferably inclined downwardly, so that when the projection is inserted in the recess, the base 106, together with the soldering iron 102 will be supported thereby. A suitable handle 112 is rigidly supported to the free extremity of the latch 109, and serves not only as a handle for operating the latch to remove the soldering iron when desired, but also serves as a weight for holding the hooked extremity of the latch in engagement with the lug 111. The free extremity of the latch is adapted to extend into the channel member 51. If desired, and in order to provide an additional means for holding the latch in an operative position, a dog 113 may be provided which is pivotally supported as at 114 by the plate 99, and is adapted to be moved into the position shown in Fig. 22, so as to engage the bottom of the latch adjacent the lug 111 to lock the latch in position as shown more clearly in Figs. 21 and 22 of the drawings.

A retaining rod 115 extends through the tubular shaft 103 of the soldering iron and is preferably provided with a tip 116 which extends below the point of the soldering iron 102, and is adapted to rest upon the cap of the can to hold the latter in position while the soldering tool is in engagement with the can and during the process of soldering. A suitable weight 117 is provided at the extremity of the retaining rod 115 for holding the rod in position so that the extremity will normally project beyond the soldering iron, and this weight is preferably provided with a flange or projection 118 which is adapted to rest upon the extremity of the tubular shaft 103 to prevent displacement of the rod. Any number of these soldering tools may be provided, and each soldering tool is independent of the remaining tools, and is supported by its respective plate 99, and is locked in position by its respective fastening means whereby any one or more of the tools may be readily removed when desired without interfering with the remaining tools.

Secured to the tubular shafts 103 of each of the soldering irons, preferably above the bearing 105, is a sprocket wheel 119 which is adapted to engage the run of the sprocket chain 64 adjacent the guide 65, as shown more clearly in Figs. 4 and 7 of the drawings, so that when the chain 64 is operated in the manner already set forth, the sprocket wheels 119 will be rotated thereby to impart a rotary motion to the respective soldering tools 102.

Projecting forwardly from the uprights or standards 47 are suitable brackets 120 (see Figs. 1 and 3) and supported by these brackets is a fuel supply pipe 121 which has any suitable source of fuel supply, and adapted to supply fuel to the burners 122, which latter are arranged above and adapted to deflect or direct the flame into the hollow soldering tools or irons 102, as shown more clearly in Fig. 3 of the drawings. One of these burners 122 is provided for each of the soldering tools and supported above the soldering tools, preferably by the base 106, is a shield 123 which extends over the burners 122, so as to protect the hand of the operator when removing or replacing the soldering tools. With this improved construction it will be seen that when the arms 49 are rocked about their point of pivotal support 48 to raise and lower the soldering tool or iron supporting frame, the soldering tools will be also raised and lowered, and that this raising and lowering motion of the tools takes place during the longitudinal movement of the main supporting frame or carriage, and as the sprocket chain is being moved through the medium of the rack 60, pinion 59 and shaft 57, the soldering tools or irons will be given an axial rotary movement while in engagement with the cans.

Spaced tracks 124 are adjustably supported by any suitable portion of the frame, preferably the member 40, by means of an adjustable arm 125 which is connected to the member 40 by a slot and bolt connection 126, 127, and these tracks are arranged below the soldering tools or irons 102. Supported by the tracks 124 and extending across the space therebetween is a conveyer 128 which is provided with projections 129 extending from the upper face thereof, and is moved longitudinally in time with the soldering machine in any desired or suitable manner (not shown), and serves as a means for conveying the cans 130, shown in dotted lines in Fig. 3 of the drawings, into position to have the caps soldered thereto. The belt or conveyer 128 is preferably constructed of a plurality of rigid members extending transversely across the tracks 124, and are connected at their adjacent edges by means of the pivotal connections 131 which extend between the tracks (see Fig. 3) so that the can 130 will have a rigid support to permit the soldering iron 102 to engage and rest upon the top of the can and to exert the necessary pressure thereon.

When the soldering tool rests upon the can and the can is advanced by the conveyer 128, and the tools advanced with the can in the manner already set forth, a rotary motion is being imparted to the soldering tools or irons which would tend to axially rotate the cans upon the supporting conveyer, and in order to prevent the can from being rotated under the influence of the soldering tools or irons, suitable mechanism must be provided for clamping the cans in position and at the same time permitting their longitudinal movement with the conveyer. Any suitable means may be provided for this purpose, but a simple and efficient means comprises a bar or rod 132 which is supported by the brackets 120 adjacent the outer edge of the conveyer and extending longitudinally for substantially the entire length of the main supporting frame or carriage. This bar or rod 132 is arranged at a suitable height above the conveyer 128 so as to engage the cans at a point preferably adjacent the upper extremities thereof. Supported by the uprights or standards 47 are suitable guide ways 133, and movable upon these guide ways is a support which extends transversely for the entire length of the frame and preferably comprises spaced members 134 connected at their extremities by a member 135, which latter are adapted to rest and move upon the guide ways 133. Suitable clamps comprising a body portion 136 having a U shaped extremity 137 are provided for forcing the cans against the bar or rod 132, and a suitable flexible fibrous member 138 is secured within the U shaped extremity 137, so that the extremities thereof will project beyond the member to engage the can 130 and be deflected, as shown in dotted lines in Fig. 9 of the drawings, when the can is clamped into position. The clamping members 136 may be secured to the spaced members 134 in any desired or suitable manner, preferably by means of a screw or bolt 139 which passes through a slot 140 in the body portion 136 and through the spaces formed between the two members 134. The bolt is preferably provided with a head 141 which engages one face of the members 134, and a nut 142 is adapted to engage the free extremity of the bolt and rest upon the body portion of the member 136 for securing the clamp in position. Any number of these clamps may be provided, preferably one for each can, and are adapted to be moved simultaneously toward or away from the cans to force the cans against the bar 132 and prevent them from axial rotation. The clamping members being mounted upon the main supporting frame or carriage and the bar 132 being also mounted thereon, the can will move in its clamped position and be advanced with the conveyer and the soldering tools or irons.

Any suitable means may be provided for advancing and retracting the gripping members 136. A suitable and efficient means for accomplishing this purpose comprises a pair of bell crank levers 143 which are pivotally mounted as at 144 to any stationary portion of the main supporting frame or carriage, preferably the uprights or standards 47, and one of these bell crank levers is located adjacent each standard. One arm of each of these bell crank levers is pivotally connected, as at 145, to one of the movable portions of the soldering iron supporting frame, preferably the end members 53 thereof (see Fig. 4) and the other extremity of each lever is preferably provided with a threaded sleeve or collar 146 which is pivotally connected thereto as at 147 (see Figs. 8 and 9). Projecting from the rear of one of the members 134 and adjacent each of the bell crank levers 143 is an extension 148 which extends for some distance to the rear of the member, and pivotally connected to the extremity is a sleeve or collar 149 through which a threaded bolt 150 is adapted to pass, and which is adapted to engage the threaded sleeve or collar 146 on the bell crank lever and is held from adjustment with respect to the sleeve 149 by means of collars 151 which engage the bolt on each side of the sleeve 149, so that when the bell crank levers are rocked, the clamping members 136 will be moved toward or away from the cans, according to the direction of movement of the bell crank levers. The bell crank levers being pivoted to a stationary portion of the main supporting frame or carriage and one extremity thereof being pivoted to the movable soldering tool supporting frame, it will be seen that when the latter is raised or lowered, the bell crank levers will be rocked about their point of pivotal support to advance or retract the clamping members.

In order to adjust the movement of the clamping members 136 to accommodate cans of various sizes, the position of the arm of the bell crank levers may be adjusted with respect to the clamping members by adjusting the screw or bolt 150, which latter may be accomplished by rotating the screw or bolt 150 in the sleeve 149, which motion will adjust the sleeve or collar 146 longitudinally thereof and thereby change the movement of the bell crank levers. The screw or bolt 150 may be provided with an angular extremity 152 for this purpose. A suitable scale 153 may be provided for indicating the adjustment of the bell crank levers, which is preferably supported by the extensions 148, and an indicator 154 may be provided, preferably on the sleeve or collar 146 to coöperate with the indicator.

The tracks 124 which form the support for conveyer 128 are preferably made in sections as shown more clearly in Figs. 1, 12 and 13 of the drawings, one of the sections being arranged to extend the entire length of travel of the main supporting frame or carriage of the machine (as shown more clearly in Fig. 1) and is connected to the adjacent extremity of the next section by means of a joint comprising two members 155, one of which is secured to each of the extremities of the track sections 124 and are provided with projections 156, located preferably at a point intermediate the diametric center of the rails, the extension 156 on one of the members 155 being shaped to form a seat 157 (see Fig. 12) and the extension on the other member 155 being provided with a rounded extremity 158 which is adapted to engage and rest in the seat 157, so that the sections of the track which support the conveyer and cans while the latter are being soldered may be adjusted vertically with relation to the other sections to properly position cans of different height, with relation to the vertical movement of the soldering tools or irons. This adjustment is accomplished through the medium of the adjustable supporting member 125 (see Fig. 1.)

From the foregoing description it is thought that the operation of this portion of the machine will be fully understood, but briefly stated, it is as follows: The main section of the supporting track 124 is first adjusted according to the height of the cans to be soldered, and the cans are placed upon the conveyer 128 in any desired or suitable manner, and are advanced to the position to be soldered by the movement of the conveyer. Assuming the soldering tools or irons 102 to be in the position shown more clearly in Figs. 1, 3 and 4 of the drawings, that is, with the pinion 79 on the upper side of the mangle rack 74 (as shown more clearly in Fig. 15 of the drawings) the soldering tool or iron supporting frame, together with the tools, will be elevated to permit the cans to pass under the soldering tools. The machine is timed to work in unison with the conveyer and when the cans have all assumed their proper position, that is, when the cans have arrived at a position under each of the soldering irons or tools after the caps have been placed thereon before being fed to the machine, the mangle rack 74 will have been raised by the pinion passing over one extremity thereof so that the pinion will be in engagement with the lower face of the rack. The raising movement of the rack will rock the arms 49 to lower the tool supporting frame, which will bring the irons into contact with the cans. By the time the soldering tool rests upon the top of the can, the rack is moved longitudinally by the pinion 79 to permit the soldering tools or irons to advance with the cans which are being fed by the conveyer, and at the same time that the soldering tools or irons are being advanced with the cans and in engagement therewith, the tools are being rotated through the medium of the sprocket chain 64, the shaft 57, pinion 59 and rack 60. This operation will continue until the main supporting frame has reached the limit of its travel in one direction, determined by the length of the mangle rack. When in this position the rack will have assumed a position to permit the pinion 79 to pass the other extremity thereof, so as to engage the upper face of the rack, and as the pinion is moving over the extremity of the rack, the rack will be lowered, which movement will again rock the arms 49 to raise the soldering tools or irons out of engagement with the cans, and when the rack has reached a position that the pinion will engage the upper face thereof, the rack will be moved bodily in a longitudinal movement in the opposite direction, and retract the main supporting frame or carriage or move the same in a position to meet the advancing cans which are being moved into position to be soldered. After the main supporting frame has reached the limit of its travel in this direction, the rack will be in a position to be raised by the pinion in the manner already set forth to lower the soldering tools or irons into engagement with the next group of cans. This operation will be continued as long as the machine is kept in operation and the cans are being fed thereto. Should it so happen that one or more of the cans is advanced to the machine without having a cap applied thereto, the retaining rod will pass into the aperture in the top of the can. Motion is imparted to all of the mechanism through the motor 85, worm gear 82 and worm screw 83, and the pinion 59 is of such a length as to permit the rack to remain in engagement therewith when the soldering tools or irons are raised or lowered. The rack will cause the soldering tools or irons to rotate in one direction during the advancement of the main supporting frame in one direction, and the direction of rotation of the tools will be reversed when the carriage is returned, thereby causing the irons to be uniformly heated and cleaned while they are being returned to their initial position.

While the soldering tools or irons are in engagement with the cans, solder may be supplied thereto in any desired or suitable manner. A simple and efficient means for supplying the solder thereto in strips 159 comprises a main supporting body 160 which is pivotally supported upon the bar or rod 161, extending transversely of the main supporting frame, and which is preferably secured to the supporting standards 47. One of these solder feeding devices is provided for each of the soldering tools or irons, and as the specific construction thereof is the same, the detailed description of one will apply equally as well to all of them. The main body portion 160 is preferably provided with an upwardly projecting portion 162 at the rear extremity thereof through which is provided an aperture 163, and the forward end is provided with a tubular extremity 164 which preferably supports tubular guides 165 which may be secured thereto by means of a clamping screw 166, and these tubular guides are arranged in line with the aperture 163 so that when the solder strip 159 is passed through these registering apertures, it will be prevented from bending or kinking. The solder strips may be supplied to the feed device in any desired or suitable manner, preferably from spools or drums supported in any convenient position adjacent the machine, one of which is located adjacent each of the feeding devices, and which is not shown. Slidingly mounted upon the body portion 160 is a member 167 which is provided with a tubular extremity 168 which is located adjacent the tubular extremity 165 of the body portion 160, and is provided with spaced projections 169, 170, the projection 170 being located adjacent the extremity thereof and terminating at a point below the extremity of the projection 169. The body of the member 167 in the rear of the extremity 168 is preferably of a channel formation as shown more clearly in Fig. 28 of the drawing, and pivotally supported thereby are dogs or pawls 171, the extremities of which are adapted to project into the channel and engage the solder strips 159 when the latter is in position, as shown more clearly in Fig. 30, and suitable springs 172 may be provided for causing the dogs to bite or grip the solder strip. A similar dog or pawl 173 is pivotally supported by the extremity 162 of the main supporting body 160, and is adapted to engage the solder strip as shown in Fig. 30, and a spring 174 is provided for holding the dog in engagement therewith, and this dog or pawl 173 acts as a retainer to prevent the solder strip from being moved out of position when the sliding member 167 is retracted in the manner as will be set forth.

Projecting laterally from the main body 160 at a point adjacent the extremity 164 thereof are lugs 175, and a member 176 is removably secured to a suitable support 177 on the supporting frame for the soldering tool, by means of a clamping screw or bolt 178 passing therethrough and engaging the support 177. This member projects preferably below the support 177 and is provided with a bifurcated extremity 179 into which the extremity 164 of the body portion 160 projects, and the arms 180 of the bifurcated extremity are provided with lateral projections or ears 181 which project below the lugs 175 and upon which these lugs are adapted to rest to support the body portion 160.

Journaled in suitable supports preferably on the uprights or standards 47 is a rock shaft 182 extending longitudinally of the frame, and supported thereby are a plurality of arms 183, one for each solder feeding device, and pivotally connected to the extremity of each arm is a dog or pawl 184 preferably in the form of a bell crank lever, the extremity of one arm of which is provided with a lateral projection 185, shown more clearly in Figs. 27, 28 and 33, and which is adapted to stand between the projections 169, 170, the projection 170 being of a sufficient height to be engaged by the extension 185 when the shaft 182 is rocked to slide the member 167 forwardly upon the member 160 to advance the solder strip 159, the dogs or pawls 171 gripping the strip to advance the same, and the dog or pawl 173 yielding to permit the strip to pass. When the shaft 182 is rocked in the opposite direction, the projection 185 will engage the extension 169 to retract the member 167. During this retrograde movement the dog or pawl 173 will grip the solder strip 159 to hold the latter in position, and the dogs or pawls 171 will yield and slide over the strip 159 into a position to obtain a new grip on the strip to advance it when the member 167 is again moved forwardly.

Any suitable means may be provided for rocking the shaft 182. A suitable and efficient means for accomplishing this purpose comprises an arm 186 (see Fig. 3) which is preferably provided on the outside of one of the uprights or standards 47 and is slotted, as at 187. A lever 188 is pivotally supported intermediate its ends, as at 189 (see Fig. 5) to any stationary portion of the main supporting frame or carriage, preferably the lower extremity of one of the uprights or standards 47. One extremity of this lever 188 is connected to the arm 186 by means of a bar or rod 190, the slot 187 in the arm 186 permitting the connected extremity of the bar 190 to be adjusted toward or away from the rock shaft 182 to vary the movement of the shaft. The free extremity 191 of the lever 188 is preferably provided with an anti-friction roller 192 (see Figs. 1 to 5) which extends into and moves within a suitable guide way having an inclined portion 193 and a horizontal portion 194, the inclined portion 193 being arranged at a point adjacent the limit of the travel of the main supporting frame or carriage in one direction so that when the main supporting frame or carriage reaches this limit of its travel, the anti-friction roller 192 will move downwardly in the inclined portion 193 to rock the lever 188, and through the medium of the connecting bar 190, raise the arm 186 and rock the shaft 182 to cause the dog 184 of the solder feeding device to move the member 167 backwardly to the position shown in Fig. 30, so that when the main supporting frame or carriage reaches the extreme limit of its movement in this direction, the solder feeding device will be in a position to advance the strips of solder.

When the frame starts to move or advance with the cans after the soldering irons have moved into engagement therewith, the anti-friction roller 192 will ride upwardly in the inclined portion 193 of the guide, which movement will depress the arm 186 and rock the shaft 182 in the opposite direction, causing the dog or pawl 184 to advance the member 167 toward the cans to feed the solder strip thereto, and when the anti-friction roller 192 reaches the horizontal portion 194 of the guide, the dogs 184 will be held against movement.

The projections 181 of the arms 180 are of such a length as to engage the lugs 175 and raise the member 160 about its point of pivotal support 161 as the solder iron supporting frame is raised, and when the soldering tools are lowered, the gravity of the solder feeding devices will cause them to move with the solder tools. The tubular extremities 165 supported by the members 160 are of such a length that when the solder tools 102 are in engagement with the cans 130, they will engage and rest upon the edge of the can to position the feeding device so that the solder strip will engage the point of the solder iron. When the extremity 165 rests upon the edge of the can, the lateral extension 185 of the dog 184 will enter the space between the projections 169 and 170 on the sliding member 167, so that when the shaft 182 is rocked, the extension 185 will engage the respective projections 169, 170 to advance the member 167. Should it so happen that a can is not present under the respective soldering iron, it will be seen that unless means were provided for preventing the feeding of the solder strip under these conditions, a surplus amount of solder would be fed by the respective device, and would be either wasted or supplied to the next can. In order to overcome this difficulty, it is necessary to prevent the respective solder feeding device from operating, and in order to accomplish this result, the solder feeding devices coöperate with the cans for throwing them into and out of operation. Any suitable mechanism may be provided for accomplishing this result, but there is preferably provided a lever 195 which is pivoted intermediate its extremities, preferably by means of a suitable support or standard 196 supported by the member 160. This standard is preferably located adjacent the delivery end of the feeding device, and one arm 197 of the lever is curved upwardly, as shown more clearly in Fig. 27 of the drawings, and extends for some distance beyond the pivot 198 and is arranged in the path of the forward movement of a lateral projection 199 on the arm 200 of the dog or pawl 184, and the other end of the lever 195 is provided with an adjustable screw or bolt 201 passing therethrough, which is adapted to engage and rest upon a suitable ear or projection 202 on the member 176. When the extremity 165 rests upon the edge of the can, the lower curved face of the arm 197 of the lever 195 will be held out of the path of movement of the projection 199 on the dog 184, to permit the lateral extension 185 on the dog to remain in the space between the projections 169, 170 on the member 167, so that when the shaft 182 is rocked to move the dog 184 forwardly, the member 167 will be advanced. If, however, when the soldering tools are lowered, there is no can under the particular soldering tool, the ears or lugs 175 on the member 160 will remain in engagement with the projecting ears 181 of the member 176 and the free extremity of the member 160 will continue to move downwardly with the soldering tools and the screw or bolt 201 engaging the projection 202 on the member 176 will rock the arm 195 about its point of pivotal support 198 to cause the extremity 197 thereof to stand within the path of the forward movement of the lateral projection 199 on the dog 184 so that when the dog is advanced it will at the same time be rocked about its point of pivotal support or connection 203 with the arm 183 to depress the arm 200 and raise the extension 185 above the projection 170, so that when the dog 184 is advanced, the lateral extension 185 will ride over the projection 170 and the member 167 will not be advanced. When the parts are in the position shown in Fig. 27, the extremity 165 will rest upon the edge of the can and the lower curved face of the arm 197 being struck upon a different arc from the arc of movement of the lateral projection 199, the latter will move freely of the arm 197 to permit the solder strips to be fed to the soldering iron, the projection 199$^a$ being provided on the arm 200 to hold the arm 197 elevated. If desired, a suitable guide 204 may be provided for the soldering strips 159 arranged in the rear of the respective feeding device, and these guides may be supported by a cross bar 205 supported by arms or brackets 206 extending from the uprights or standards 47.

With this improved construction it will be seen that each of the solder feeding devices is independent of the remaining devices, and any one or more may be readily removed when desired without interfering with the others, and furthermore, that when the cans are in proper position, the solder strips will be automatically fed to the respective soldering irons and when a can is missing, the respective device will be prevented from feeding the solder strip, thereby obviating the possibility of wasting the solder.

If desired, the track section under the soldering tools or irons may be adjusted by means of suitable adjusting screws or bolts 207 which pass through the arm or bracket 125 and engage a portion of the standards 40. The screws or bolts 126 may be loosened to permit this adjustment and when the desired height of the track section has been obtained, the bolts 126 may be tightened to clamp or secure the parts in their adjusted position. Furthermore, with this improved construction, any one or more of the soldering tools may be detached from the machine without stopping the operation thereof, and also without interfering with the respective operation of the remaining soldering tools. This detachment or removal is accomplished by means of a handle 112, which is connected to the latch and when the tools are detached, the handle 112 may be used for transporting the tools, and also for positioning the tools upon the machine.

In order that the invention might be fully understood by those skilled in the art, the details of the foregoing embodiment thereof have been thus specifically described, but

What we claim as new and desire to secure by Letters Patent is—

1. The combination of a conveyer for feeding the cans, a rotary soldering tool movable back and forth in the direction of movement of the cans, means for causing the tool to engage the can, and means for moving the tool with the can as the latter is moved through the machine.

2. The combination of a continuously moving conveyer for feeding the cans, a soldering tool movable back and forth in the direction of movement of the cans, means for causing the tool to engage the can, and mechanism for simultaneously rotating the tool and for moving it with the can as the latter is moved through the machine.

3. The combination of a conveyer for feeding the cans, a soldering tool movable back and forth in the direction of movement of the cans, means for causing the tool to engage the can, means for moving the tool with the can as the latter is moved through the machine, and means for imparting an axial rotation to the tool.

4. The combination of a conveyer for feeding the cans, a rotary soldering tool movable back and forth in the direction of movement of the cans, means for moving the tool into and out of engagement with the can, and means operatively related to the last said means for advancing the tool with the can while in engagement therewith as the latter moves through the machine and for moving the tool to meet the advancing can to be soldered.

5. The combination of a conveyer for feeding the cans, a soldering tool, can-controlled mechanism for supplying solder to said tool, means for moving the tool into and out of engagement with the can, means operatively related to the last said means for advancing the tool with the can while in engagement therewith and as the latter moves through the machine and for moving the tool when out of engagement with the can in a direction opposed to the direction of movement of the advancing can to be soldered and means for imparting a movement to the tool other than its bodily movement during its bodily movement in each direction.

6. The combination of a conveyer for feeding the cans, a soldering tool, means for moving the tool into and out of engagement with the can, means operatively related to the last said means for advancing the tool with the can while in engagement therewith and as the latter moves through the machine and for moving the tool when out of engagement with the can, in a direction opposed to the direction of movement of the advancing can to be soldered, and means for axially rotating the soldering tool.

7. The combination of a conveyer for feeding the cans, a soldering tool, means for moving the tool into and out of engagement with the can, means for bodily advancing the tool with the can while in engagement therewith and as the latter moves through the machine, and for imparting a bodily retrograde movement to the tool when out of engagement with the can in a direction opposed to the movement of the cans to position the tool with relation to the can to be soldered, and means for axially rotating the tool during the bodily movement thereof in one direction and for imparting an axial rotation in the opposite direction during the retrograde bodily movement of the tool.

8. In a machine for soldering cans, the combination of means for feeding the cans and continuously moving them through the machine, a soldering tool, means for moving the tool into and out of engagement with the can, means for bodily advancing the tool with the can while in engagement therewith and as the latter moves through the machine, and for imparting a bodily retrograde movement to the tool when out of engagement with the can in a direction opposed to the movement of the cans to position the tools with relation to the can to be soldered, and means for axially rotating the tool during the bodily movement thereof in one direction and for imparting an axial rotation in the opposite direction during the retrograde bodily movement of the tool.

9. The combination of a conveyer for feeding the cans, a soldering tool, means for causing the tool to engage the can, means for bodily advancing the tool with the can as the latter moves through the machine, means for imparting an axial rotation to the tool, and means adapted to grip and hold the can against rotation by the tool.

10. The combination of a conveyer for feeding the cans, a soldering tool, means for moving the tool into and out of engagement with the can, means for bodily advancing the tool with the can as the latter moves through the machine, means operated in unison with the first said means adapted to grip and hold the can against movement by the tool with respect to the conveyer, and means for rotating the tool.

11. The combination of a conveyer for feeding the cans, a soldering tool, a mangle rack for moving the tool into and out of engagement with the can and for advancing the tool with the can while moving through the machine, said rack being also adapted to return the tool to meet an advancing can to be soldered, means for rotating the tool, clamping means for holding the can against rotary movement, and means for operating the last said means.

12. The combination of means for feeding the cans, a soldering tool, means for moving the tool into and out of engagement with the can, means for bodily advancing the tool with the can while in engagement therewith and for returning the tool when out of engagement with the can, means for heating the tool and means for rotating the tool during its bodily movement in both directions, said means including a rack and pinion, one of which is provided with an extended active face, one of the last two elements being operatively related to the said rotating means and the other being stationary with respect to the bodily movement of the tool.

13. The combination of a conveyer for feeding the cans, a support adjacent the conveyer, a carriage mounted upon the support and movable adjacent a portion of the conveyer, a plurality of independent unitary soldering tools mounted upon the carriage, means for bodily moving the irons with respect to the carriage into and out of engagement with the cans, and means operatively related to the last said means for reciprocating the carriage upon its support to impart another bodily movement to the tools to advance the latter while in engagement with the cans and for returning the tools when out of engagement therewith.

14. The combination of a conveyer for feeding the cans, a carriage mounted for movement adjacent a portion of the conveyer, a plurality of soldering tools mounted upon the carriage for independent bodily movement with respect to the movement of the carriage, means for imparting said independent bodily movement to the tools, and means for reciprocating the carriage upon its support to impart another bodily movement to the tools to advance the tools with the cans as the latter move.

15. The combination of a conveyer for feeding the cans, a carriage mounted for movement adjacent a portion of the conveyer, a plurality of soldering tools mounted upon the carriage for independent movement with respect to the movement of the carriage, means for imparting said movement to the tools, means for imparting another independent movement to the tools with respect to the movement of the carriage, and means for reciprocating the carriage with respect to the conveyer to advance the tools with the cans as the latter move through the machine.

16. The combination of a conveyer for imparting a continuous advancing movement to the cans, a carriage mounted for movement adjacent a portion of the conveyer, a plurality of soldering tools mounted upon the carriage for independent movement with respect to the movement of the carriage, means for imparting said movement to the tools, means for imparting another independent movement to the tools with respect to the movement of the carriage, and means for reciprocating the carriage with respect to the conveyer to advance the tools with the cans as the latter move through the machine.

17. A machine of the class described including in combination a plurality of independent soldering tools, a support for the tools, means individual to the tools for operating the latter and means for independently and detachably securing the tools to the support whereby the tools and their respective operating means may be removed and applied as complete units.

18. A machine of the class described including in combination, a movable support, means for moving the support, a plurality of independent soldering tools, means individual to the tools for operating the latter and means for independently and detachably securing the tools to the support whereby the tools and their respective operating elements may be removed and applied as complete units.

19. A machine of the class described including in combination means for feeding the cans, a movable support, means for moving the support in unison with the first said means, a plurality of independent soldering tools, and separate means for removably securing the tools to the support independently of each other whereby the tools and their respective operating means may be removed as complete units.

20. A machine of the class described, including in combination a support, a plurality of soldering tools, a separate supporting base for each of the tools, means for detachably securing the said bases and tools to the support independently of each other and means for imparting an axial rotation to said tools, each of said bases, tools and rotating means being detachable as complete units.

21. A machine of the class described including in combination a support, a plurality of soldering tools, separate supporting bases for each of the tools, means for detachably securing the said bases and tools to the support independently of each other, separate means operatively related to each of the tools and operable independently of each other for rotating the tools, and a common means for operating the last said means, each of said bases, tools and operating means being detachable as complete units.

22. A machine of the class described including in combination a support, a plurality of axially rotatable soldering tools, separate supporting bases for each of the tools, means for detachably securing the said bases and tools to the support independently of each other, means for imparting motion to the tools and separate means operatively related to each of the tools and adapted to detachably engage and be operated by the last said means whereby any one or more of the bases, tools and motion-imparting means may be independently detached as a complete unit from the support without interfering with the operation of the remaining tools.

23. A machine of the class described, including in combination a support, a plurality of axially rotatable soldering tools, separate supporting bases for each of the tools, means for detachably securing the said bases and tools to the support independently of each other, a gear element operatively related to each of the tools, an additional gear element adapted to be detachably engaged by the first said gear elements whereby the bases, tools and gears may be independently detached from the support as complete units without interfering with the operation of the remaining tools, and means for imparting motion to the said additional gear element.

24. A machine of the class described, including in combination a support, a plurality of rotatable soldering tools, separate supporting bases for each of the tools, means for detachably securing the said bases and tools to the support independently of each other, means for axially rotating the tools, means for raising and lowering the tools, and a common means for operating the tool rotating means in either position of the tools, each of said tools, bases and rotating means being removable as complete units.

25. A machine of the class described, including in combination a can rest for a plurality of cans, a support, a plurality of rotatable soldering tools, means for detachably securing the tools to the support independently of each other, means for rotating the tools, means for reciprocating the tools in a plane parallel with relation to the can rest, means for moving the tools into different vertical planes with relation to the can rest and means for imparting an axial rotation to the tools as the latter are reciprocated, the last said means being adapted to rotate the tools in one direction when the tools are bodily moved in one direction and to impart an opposite rotation thereto when the tools are returned.

26. A machine of the class described including in combination a support, a plurality of soldering tools, a common means for rotating the tools, means for detachably securing the tools to the support independently of each other, whereby any one or more of said tools may be removed without interfering with the remaining tools, means for heating the tools, and a separate shield for each of the tools.

27. A machine of the class described including in combination a plurality of soldering tools, a separate support for each of the tools, a main support, separate means for detachably securing the tool supports to the main support whereby the tools may be detached from the main support independently of each other, and a handle operatively related to the said securing means for operating the latter and by means of which the respective tool may be transported when detached.

28. A machine of the class described including in combination a plurality of soldering tools, a separate support for each of the tools, a main support, separate means for detachably securing the tool supports to the main support whereby the tools may be detached from the main support independently of each other, a handle operatively related to the said securing means for operating the latter and by means of which the respective tool may be transported when detached, separate means for heating the tools, and a shield disposed between the heating means and the said handle.

29. A machine of the class described, including in combination a plurality of soldering tools, a separate support for each of the tools, a main support, separate means for detachably securing the tool supports to the main support whereby the tools may be detached from the main support independently of each other, a handle operatively related to the said securing means for operating the latter and by means of which the respective tool may be transported when detached, means for rotating the tools, and separate means operatively related to each of the tools and adapted to detachably engage the last said means whereby the tools will be rotated independently of each other when in position.

30. A machine of the class described including in combination a plurality of soldering tools, supports for each of the tools, a main support, one of the supports being provided with an extension and the other with a shoulder over which the extension engages to hold the respective tool in position, one of the supports being also provided with a projection, a catch mounted on the other support and adapted to engage the said projection for securing the respective tool in position, and means operatively related to the catch for manipulating the latter.

31. A machine of the class described including in combination a plurality of soldering tools, supports for each of the tools, a main support, one of the supports being provided with an extension and the other with a shoulder over which the extension engages to hold the respective tool in position, one of the supports being also provided with a projection, a catch pivoted to the other support and adapted to engage the said projection for securing the respective tool in position, and means for locking the catch against movement when the tool is in operative position.

32. A machine of the class described including in combination a plurality of soldering tools, supports for each of the tools, a main support, one of the supports being provided with an extension and the other with a shoulder over which the extension engages to hold the respective tool in position, one of the supports being also provided with a projection, a catch pivoted to the other support and adapted to engage the said projection for securing the tool in position, and a handle operatively related to the catch for manipulating the latter and by means of which the respective tool may be transported when detached, said handle serving also to hold the catch in engagement with the said projection.

33. A machine of the class described including in combination a plurality of rotatable soldering tools, a separate support for each of the tools, a main support, means for moving the main support, an operating member mounted upon the main support, means for imparting movement to said operating members, means for detachably and removably securing the tool supports to the main supports whereby the tools may be removed and replaced independently of each other and while the main support is in motion, and means operatively related to each of the tools and adapted to engage the said operating member for rotating the tools when the latter are in position upon the main support.

34. A machine of the class described including in combination, means for feeding the cans, a support adjacent the path of movement of the cans, a soldering tool mounted upon the support for movement into and out of engagement with the can, means for moving the tool, means for imparting a rotary movement to the tool when in engagement with the can, means for holding the can against movement by the tool, said means including a member arranged adjacent one side of the can, a member adjacent the opposite side of and movable toward and from the can and adapted to cooperate with the other said member to clamp the can, means for operating the said movable member, and means for advancing the tools while in engagement with the cans and as the latter move through the machine.

35. A machine of the class described including in combination, means for feeding the cans, a support adjacent the path of movement of the cans, a soldering tool mounted upon the support for movement into and out of engagement with the can, means for moving the tool, means for imparting a rotary movement to the tool when in engagement with the can, means for holding the can against movement by the tool, said means including a member arranged adjacent one side of the can, a member adjacent the opposite side of and movable toward and from the can and adapted to cooperate with the other said member to clamp the can, means controlled by the movement of the tools for operating the said movable member, and means for advancing the tools while in engagement with the cans and as the latter move through the machine.

36. A machine of the class described including in combination means for feeding the cans, a support adjacent the path of movement of the cans, a soldering tool mounted upon the support for movement into and out of engagement with the can, means for moving the tool, means for imparting a rotary movement to the tool when in engagement with the can, means for holding the can against movement by the tool, said means including a member arranged adjacent one side of the can, a member adjacent the opposite side of and movable toward and from the can and adapted to cooperate with the other said member to clamp the can, means for operating the said movable member, means for varying the limit of movement of said member, and means for advancing the tools while in engagement with the cans and as the latter move through the machine.

37. A machine of the class described including in combination means for feeding the cans, a support mounted for movement adjacent the path of movement of the cans, a soldering tool mounted upon the support for movement into and out of engagement with the can, means for rotating the tool, a member arranged adjacent one side of the path of movement of the can, a movable member arranged adjacent the other side of the can and opposite to the first member, means controlled by the movement of the tool toward the can for adjusting the movable member toward the first said member to clamp and hold the can against rotation, and means for moving the support to advance the tool with the can along the path of movement of the can and while in engagement therewith.

38. A machine of the class described including in combination, means for feeding the cans, a soldering tool, movable back and forth in the line of feeding movement of the cans, a support for the tool, means for moving the tool into engagement with the can, means for advancing the tool with the can as the latter is moved through the machine, and means for feeding solder to the tool.

39. A machine of the class described, including in combination means for feeding the cans, a soldering tool, movable back and forth in the line of feeding movement of the cans, a support for the tool, means for moving the tool into engagement with the can, means for advancing the tool with the can as the latter is moved through the machine, and means for intermittently feeding solder to the tool.

40. A machine of the class described, including in combination means for feeding the cans, a soldering tool, a support for the tool, means for moving the tool into and out of engagement with the can, means for bodily moving the tool to advance the same with the can while in engagement therewith and as the can moves through the machine, and means also mounted upon and movable with the tool support and operating in unison with said bodily movement of the tool for feeding solder to the tool.

41. A machine of the class described including in combination means for continuously feeding the cans to the machine, a vertically movable soldering tool, means for raising and lowering the tool, means for bodily moving the tool in unison with the can during the period it engages the can and as the can is advanced through the machine and means mounted upon and movable with the tool support for automatically feeding a strip of solder to the tool during the bodily movement of the tool with the can.

42. A machine of the class described including in combination means for feeding the cans to the machine, a vertically movable soldering tool, means for raising and lowering the tool, means for imparting axial rotation to the tool, means for bodily moving the tool with the can while in engagement therewith and as the can is advanced through the machine, and means for automatically feeding a strip of solder to the tool as the latter is advanced with the can.

43. A machine of the class described including in combination, means for feeding the cans to the machine, a vertically movable soldering tool, means for raising and lowering the tool, means for automatically feeding a strip of solder to the tool when the latter is in engagement with the can, and means separate from the tool for automatically rendering the solder-feeding mechanism inactive when a can is not properly presented to the tool.

44. A machine of the class described, including in combination means for feeding the cans to the machine, a vertically movable soldering tool, means for raising and lowering the tool, means for automatically feeding a strip of solder to the tool when the latter is in engagement with the can, and means separate from the tools whereby when a portion of the solder feeding device engages the can the solder will be fed and when said portion of the device does not engage the can the solder feeding device will be rendered inactive.

45. A machine of the class described including in combination a vertically movable soldering tool, a solder feeding device movable with the tool and also independently of the tool, means for normally holding said feeding device in an inactive position, and means separate from the tool whereby when a portion of the feeding device engages the can as it moves with the tool the feeding device will be rendered active, while when no can is engaged by the said device the latter will remain in an inactive position.

46. A machine of the class described including in combination a vertically movable soldering tool, a solder feeding device movable with the tool and also independently of the tool, said feeding device being normally held in an inactive position, and means separate from the tool and its operating means for arresting the movement of the feeding device with respect to the movement of the tool when a can is properly positioned to be soldered and to render the solder-feeding device active, while the absence of a can will permit the solder feeding device to continue in its movement with the tool to maintain the said device in an inactive position.

47. A machine of the class described including in combination, a support, a soldering tool mounted upon the support for vertical movement, a solder feeding device mounted for movement upon the support with the tool and also independently of the tool, means separate from the tool and its operating mechanism whereby when the feeding device engages a can the said device will be rendered active, and when the said device does not engage the can it will be rendered inactive, and means controlled by the movement of the tool for controlling the movement of the solder feeding device.

48. A machine of the class described including in combination, a support, means for reciprocating the support, a soldering tool mounted for vertical movement on the support, a solder feeding device movable with the tool and also independently thereof, means separate from the tool for arresting the movement of the feeding device with respect to the movement of the tool when a can is properly positioned to be soldered and to render the feeding device active while the absence of a can will permit the solder feeding device to continue to move with the tool to maintain the device inactive, and means controlled by the movement of the said support for operating the solder feeding device.

49. A machine of the class described including in combination a soldering tool, a vertically movable support for the tool, a solder wire feeding device independent of the tool and including a reciprocating feeding member, a releasing member arranged adjacent the feeding member, and means operatively related to the support and coöperating with the releasing member for adjusting the latter to control the said feeding member.

50. A machine of the class described including in combination a soldering tool, a vertically movable support for the tool, a pivotally supported solder wire feeding device independent of the tool and including a reciprocating feeding member, means on the support adapted to engage and position the solder feeding device, means separate from the tool for operating the said feeding device, a releasing member, and means operatively related to the said support for controlling the releasing member.

51. A machine of the class described including in combination a soldering tool, a vertically movable support for the tool, a pivotally supported solder wire feeding device including a reciprocating feeding member, means detachably engaging said member for reciprocating the same, a releasing member adapted to disengage the last said means from the feeding member to render the latter inactive, and means operatively related to the support for adjusting the said releasing member.

52. A machine of the class described including in combination a vertically movable soldering tool, a pivotally mounted solder wire feeding device, means for supporting the delivery end of the said feeding device, said delivery end being adapted to engage and rest upon the can, means for operating the feeding device when in such position to feed the wire, and means for rendering said feeding device inoperative when the delivery end thereof is out of engagement with the can.

53. A machine of the class described including in combination a vertically movable soldering tool, a pivotally mounted solder wire feeding device, means for supporting the delivery end of the said feeding device, said delivery end being adapted to engage and rest upon the can, means for operating the feeding device when in such position to feed the wire, a releasing member for throwing the feeding device out of operation when the delivery end thereof is out of engagement with the can, and means controlled by the movement of the tool for adjusting the said releasing member.

54. A machine of the class described including in combination a vertically movable support, a soldering tool carried by the support, a pivotally mounted solder wire feeding device provided with a lateral projection, means on the support adapted to be detachably engaged by the projection for supporting and moving the delivery end of the feeding device with the support, the said delivery end being adapted to engage and rest upon the can to permit the support to move independently thereof, and means for rendering said device operative only when the delivery end is in engagement with the can.

55. A machine of the class described including in combination a solder wire feeding device comprising a pivotally mounted main support, a feeding member mounted for movement thereon, an operating member detachably engaging the feeding member, the delivery end of the said device being adapted to engage and rest upon the can, means for imparting motion to the said feeding member when the said device is in engagement with the can, and a releasing member adapted to move the operating member out of engagement with the feeding member when the said device is out of engagement with the can.

56. A machine of the class described including in combination a solder wire feeding device comprising a pivotally mounted main support, a feeding member mounted for movement thereon, said device being adapted to engage and rest upon the can, an operating pawl detachably engaging the feeding member for moving the latter to feed the solder when the said device is in engagement with the can, means for imparting motion to the pawl, a releasing member adjacent the pawl, and means for moving the releasing member into the path of movement of a portion of the pawl to cause the pawl to assume an inoperative position with relation to the feeding member when the said feeding device is out of engagement with the can.

57. A machine of the class described including in combination a pivotally supported solder wire feeding device, the delivery end of said device being adapted to engage and rest upon the edge of the can, a dog for operating said device to feed the solder when in said position, a guide way, means operatively connected to said dog and movable in the guide way for imparting motion to the said dog, and means for preventing the operation of the feeding device by the dog when the said device is out of engagement with the can.

58. A machine of the class described including in combination a pivotally supported solder wire feeding device, the delivery end of said device being adapted to engage and rest upon the edge of the can, a dog for operating said device to feed the solder when in said position, a crank arm operatively connected to the dog for imparting motion thereto, a guide way having an inclined portion, means movable in said guide way and operatively connected to the crank arm for imparting motion thereto and means for preventing the operation of the feeding device by the dog when the said device is out of engagement with the can.

59. In combination in a machine of the class described, a conveyer for the cans, a sectional support for the conveyer, and means for adjusting one of the said sections with relation to the adjacent section.

60. In combination in a machine of the class described, a continuous horizontal conveyer for the cans, a sectional support for the conveyer, and means for vertically adjusting one of the said sections with relation to the adjacent section.

61. In combination in a machine of the class described, a continuous flexible conveyer, a support for said conveyer comprising sections hinged together, and means for adjusting one of the sections of with relation to the adjacent section.

62. In combination in a machine of the class described, a continuous flexible conveyer, a sectional support for the conveyer, said supports being provided on their adjacent extremities with overlapping projections, one of said projections being provided with a rounded portion and the other with a seat adapted to receive said rounded portion for detachably hinging the sections together, and means for adjusting one of the said supporting sections with respect to the other.

63. A machine of the class described including in combination a conveyer for advancing the cans, a support movable adjacent a portion of the conveyer, a soldering tool mounted upon the support, means for advancing the support to move the tool with the cans as the latter are advanced by the conveyer and means for cushioning the support as the latter reaches the limit of its movement.

64. A machine of the class described including in combination a conveyer for advancing the cans, a movable support, means for reciprocating the support along the line of travel of the conveyer, a soldering tool mounted upon the support, and means for cushioning the support at substantially the limit of its movement in both directions, said cushioning means being adapted to assist in starting the support upon its return movement.

65. A machine of the class described including in combination a conveyer for advancing the cans, a movable support, means for reciprocating the support along the line of travel of the conveyer, a soldering tool mounted upon the support, means for cushioning the support at substantially the limit of its movement in both directions, said cushioning means being adapted to assist in starting the support upon its return movement, and means for adjusting the said cushioning means.

66. In a machine of the class described the combination of a continuously traveling can-conveyer, a group of individual soldering units, a common carriage therefor arranged to periodically travel in unison with said conveyer, and to move said soldering units into soldering relation with the can, and an automatic can-controlled solder feed device individual to said soldering units.

67. In a can soldering machine, the combination of a tool adapted to engage a can, means for moving the tool into engagement with the can, a solder holding means for positioning solder with relation to the tool, means operatively related to the tool moving means for feeding the solder to the tool when the solder holding means is in a certain position, a releasing member for throwing the solder feeding means out of action when the solder holding means is out of said position, and means separate from the tool adapted to coöperate with the can for retaining the solder holding means in said position when a can is present.

In testimony whereof we have signed our names to this specification, in the presence of two subscribing witnesses, on this 15th day of February A. D. 1908.

FRED G. DICKERSON.
EDMUND A. SIMPSON.

Witnesses:
J. H. JOCHUM, Jr.,
CHAS. H. SEEM.